United States Patent

Sato et al.

[11] Patent Number: 5,100,759
[45] Date of Patent: Mar. 31, 1992

[54] COLOR LIGHT-SENSITIVE MATERIAL WITH INFRARED DYE RELEASER

[75] Inventors: Kozo Sato; Hiroshi Hara; Koki Nakamura; Masaaki Tsukase; Katsuyuki Watanabe, all of Kanagawa, Japan

[73] Assignee: Fuji Photo Film Co., Ltd., Kanagawa, Japan

[21] Appl. No.: 391,905

[22] Filed: Aug. 10, 1989

[30] Foreign Application Priority Data

Aug. 10, 1988 [JP] Japan .................. 63-199444
Jan. 13, 1989 [JP] Japan .................. 1-7262
Jan. 17, 1989 [JP] Japan .................. 1-8153

[51] Int. Cl.$^5$ .................. G03C 5/54; G03C 7/26; G03C 5/16
[52] U.S. Cl. .................. 430/203; 430/222; 430/223; 430/559; 430/562; 430/944
[58] Field of Search .................. 430/203, 223, 224, 225, 430/226, 562, 559, 944, 222

[56] References Cited

U.S. PATENT DOCUMENTS

| | | | |
|---|---|---|---|
| 4,500,626 | 2/1985 | Naito et al. | 430/223 |
| 4,533,626 | 8/1985 | Ono et al. | 430/223 |
| 4,606,991 | 8/1986 | Kawata et al. | 430/223 |
| 4,783,396 | 11/1988 | Nakamura et al. | 430/223 |

Primary Examiner—Richard L. Schilling
Attorney, Agent, or Firm—Sughrue, Mion, Zinn, Macpeak & Seas

[57] ABSTRACT

A silver halide color light-sensitive material comprising a support having thereon at least a silver halide and an infrared-absorbing image-forming compound represented by formula (I):

$$(Dye-X)_q-Y \qquad (I)$$

wherein Dye represents an infrared-absorbing dye group or an infrared-absorbing dye precursor group derived from a compound represented by formula (II)A, (II)B or (II)C; X represents a chemical bond or a connecting group; Y represents a group capable of making a difference in the diffusibility of the dye component of said compound represented by formula (I) between before and after the reaction with the silver halide having a latent image in correspondence or counter correspondence to the silver halide; having a latent image and q represents an integer 1 or 2, and when q is 2, the two (Dye-X) groups may be the same or different:

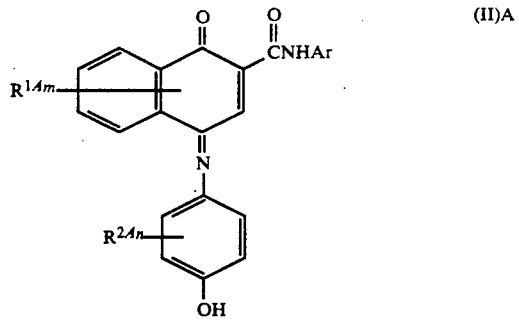

(II)A wherein $R^{1A}$ and $R^{2A}$ may be the same or different and each represents a substituent as defined in the specification; and Ar represents an aryl group or a heterocyclic group, which substituents may be further substituted by other substituents;

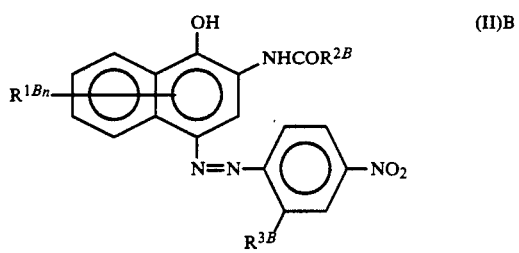

(II)B wherein $R^{1B}$ has the same meaning as $R^{1A}$; $R^{2B}$ represents a substituent selected from the group consisting of an alkyl group, an aryl group, a heterocyclic group, an alkoxy group and an amino group; and $R^{3B}$ represents a substituent as defined in the specification;

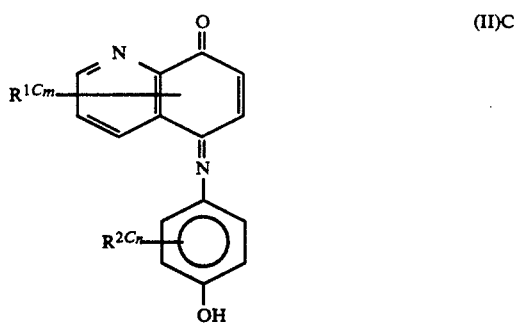

(II)C wherein $R^{1C}$ and $R^{2C}$ may be the same or different and each has the same meaning as $R^{1A}$; and m and n each represents an integer of from 0 to 4, with the proviso that if m and n each is 2 to 4, the plurality of substituents may be the same or different, these substituents may be further substituted by other substituents;

Dye and X may be bonded to each other in any position in formulas (II)A, (II)B and (II)C.

15 Claims, No Drawings

COLOR LIGHT-SENSITIVE MATERIAL WITH INFRARED DYE RELEASER

FIELD OF THE INVENTION

The present invention relates to a novel infrared-absorbing image-forming compound and a color light-sensitive material containing the infrared-absorbing image-forming compound.

BACKGROUND OF THE INVENTION

A color diffusion transfer photography has heretofore been known comprising a dye-forming compound which provides a dye having a different diffusivity from that of the dye-forming compound itself as a result of the development of silver halide under an alkaline basic condition. In such a system, three color dyes, i.e., yellow, magenta and cyan dyes are normally used to form color images which have little or no absorption in a wavelength region longer than visible light region, i.e., infrared region. In general, the edge of absorption by a cyan dye in a long wavelength region extends to 700 nm or longer. However, no cyan dyes are known which have a strong absorption in the infrared region.

In recent years, on the other hand, optical character readers and label bar code readers have been developed and put into frequent use. Thus, these readers have acquired greater importance. Most of these readers are equipped with a light-emitting diode or semiconductor laser which emit light having a wavelength of 700 nm or longer as a light source for reading.

In another apparatus which is widely used, a tungsten lamp is used as a light source and an element having a peak of light-receiving sensitivity in the vicinity of 900 nm and a sensitivity region in the range of about 700 to 1,200 nm is used as a light-receiving element. However, since images formed from the above described dyes have little or no light absorption in the near infrared region of 700 nm or higher, these image data cannot be read or can be hardly read by these readers.

Thus, it has been keenly desired to provide a diffusion transfer type color image-forming compound having light absorption in a wavelength region of 700 nm or higher, preferably 750 nm or higher.

SUMMARY OF THE INVENTION

It is therefore an object of the present invention to provide a diffusion transfer type color image-forming compound having a strong absorption in a near infrared region (700 nm or more) and having excellent photographic properties such as transfusibility and fastness.

It is another object of the present invention to provide a color light-sensitive material which can read image data by utilizing an image reading apparatus equipped with a readily available light source such as a semiconductor laser.

These and other objects of the present invention will become more apparent from the following detailed description and examples.

These objects of the present invention are accomplished with a silver halide color light-sensitive material comprising a support having thereon at least a silver halide and an infrared-absorbing image-forming compound represented by formula (I):

$$(\text{Dye} - \text{X})_q - \text{Y} \quad \text{(I)}$$

wherein Dye represents an infrared-absorbing dye group or an infrared-absorbing dye precursor group derived from a compound represented by formula (II)A, (II)B or (II)C; X represents a chemical bond or a connecting group; Y represents a group capable of making a difference in the diffusibility of the dye component of said compound represented by formula (I) between before and after the reaction with the silver halide having a latent image in correspondence or counter correspondence to the silver halide having a latent image; and q represents an integer 1 or 2, and when q is 2, the two (Dye-X) groups may be the same or different:

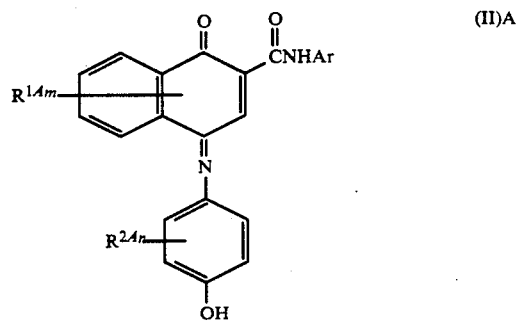

(II)A wherein $R^{1A}$ and $R^{2A}$ may be the same or different and each represents a substituent selected from the group consisting of a hydrogen atom, a halogen atom, a hydroxyl group, a cyano group, a carboxyl group, a sulfo group, an alkyl group, a cycloalkyl group, an aralkyl group, an aryl group, a heterocyclic group, an alkoxy group, an aryloxy group, an amino group, an acylamino group, a sulfonylamino group, an acyl group, a sulfonyl group, a carbamoyl group, a sulfamoyl group, a ureido group, a urethane group, an alkylthio group, an arylthio group, a nitro group and an alkoxycarbonyl roup; and Ar represents an aryl group or a heterocyclic group, which substituents may be further substituted by other substituents;

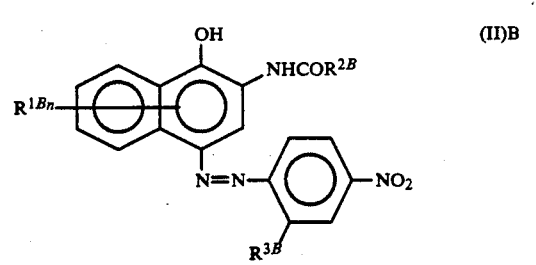

(II)B wherein $R^{1B}$ has the same meaning as $R^{1A}$; $R^{2B}$ represents a substituent selected from the group consisting of an alkyl group, an aryl group, a heterocyclic group, an alkoxy group and an amino group; and $R^{3B}$ represents a substituent selected from the group consisting of a halogen atom, an alkoxy group, an amino group, an alkylthio group, an aryloxy group, an acylamino group, an aryl group and a heterocyclic group, which substituents may be further substituted by other substituents;

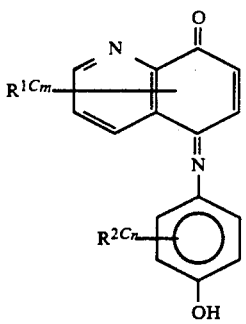
(II)C wherein $R^{1C}$ and $R^{2C}$ may be the same or different and each has the same meaning as $R^{1A}$; and m and n each represents an integer of from 0 to 4, with the proviso that if m and n each is 2 to 4, the plurality of substituents may be the same or different, these substituents may be further substituted by other substituents;

Dye and X may be bonded to each other in any position in formulas (II)A, (II)B and (II)C.

DETAILED DESCRIPTION OF THE INVENTION $R^{1A}$, $R^{2A}$, $R^{1B}$, $R^{1C}$ and $R^{2C}$ may be the same or different and each represents a hydrogen atom, a halogen atom (e.g., chlorine, bromine), an alkyl group (e.g., a $C_{1-8}$ alkyl group, such as methyl, ethyl, isopropyl, hydroxyethyl, methoxyethyl, cyanoethyl, trifluoromethyl), a cycloalkyl group (e.g., cyclopentyl, cyclohexyl), an aralkyl group (e.g., benzyl, 2-phenethyl), an aryl group (e.g., phenyl, p-tolyl, p-methoxyphenyl, o-methoxyphenyl), an alkoxy group (e.g., $C_{1-8}$ alkoxy group, methoxy, ethoxy, isopropoxy, 2-methoxyethoxy, 2-hydroxyethoxy), an aryloxy group (e.g., phenoxy, p-methoxyphenoxy, o-carboxyphenoxy), a cyano group, an acylamino group (e.g., acetylamino, propionylamino, o-carboxybenzoylamino), a sulfonylamino group (e.g., methanesulfonylamino, benzenesulfonylamino, p-methoxybenzenesulfonylamino), a ureido group (e.g., 3- methylureido, 3,3-dimethylureido), an alkylthio group (e.g., methylthio, ethylthio), an arylthio group (e.g., phenylthio, o-carboxyphenylthio), an alkoxycarbonyl group (e.g., methoxycarbonyl, ethoxycarbonyl), a carbamoyl group (e.g., methylcarbamoyl, dimethylcarbamoyl), a sulfamoyl group (e.g., methylsulfamoyl, dimethylsulfamoyl), a sulfonyl group (e.g., methanesulfonyl, ethanesulfonyl, 2-methoxyethylsulfonyl), an acyl group (e.g., acetyl, propionyl, cyanoacetyl, acetoacetyl), a urethane group (e.g., methylurethane, ethylurethane), an amino group (e.g., amino, methylamino, dimethylamino, carboxymethylamino, o-carboxyanilino, p-hydroxyaniline), a hydroxyl group, a carboxyl group or a heterocyclic group (e.g., α-pyridyl, Γ-pyridyl, 2-furyl). Particularly preferred among these groups are an alkyl group containing 6 or less carbon atoms, an alkoxy group containing 6 or less carbon atoms, a chlorine atom, an acylamino group containing 7 or less carbon atoms, a sulfonylamino group containing 7 or less carbon atoms, an aryloxy group containing 8 or less carbon atoms, a hydroxyl group, a carboxyl group, a carbamoyl group containing 7 or less carbon atoms and a sulfamoyl group containing 7 or less carbon atoms.

The term "a $C_{x-y}$ group" used herein represents a group having from x to y carbon atoms.

Particularly preferred groups for $R^{1A}$, $R^{1B}$ and $R^{1C}$ are an acylamino group, a sulfonylamino group, a carbamoyl group, a sulfamoyl group, a urethane group and a ureido group. Particularly preferred group for $R^{2A}$ and $R^{2C}$ are a halogen atom, an alkoxy group, an acylamino group, a carbamoyl group and sulfamoyl group.

Ar represents an aryl group or a heterocyclic group. Examples of such an aryl group include a 2-carboxyphenyl group, a 3-carboxyphenyl group, a 3-hydroxyphenyl group, a 3-methanesulfonamidephenyl group, a 4-carboxymethylphenyl group, and a 4-methoxy-3-sulfamoylphenyl group. Examples of such a heterocyclic group include a 2-pyridyl group, a 3-pyridyl group, a 4-pyridyl group, a 2-pyrimidyl group, a 2-thiazolyl group, and a 4-methyl-2-thiazolyl group.

$R^{2B}$ represents an alkyl group (e.g., an alkyl group containing 6 or less carbon atoms, such as methyl, ethyl), an aryl group (e.g., an aryl group containing 8 or less carbon atoms, such as 2-carboxyphenyl, 4-methanesulfonamidephenyl), a heterocyclic group (e.g., α-pyridyl, 2-chenyl, 2-furyl, morpholino), an alkoxy group (e.g., methoxy, ethoxy, methoxyethoxy) or an amino group (e.g., methylamino, dimethylamino). Particularly preferred among these groups are an alkyl group containing 3 or less carbon atoms, an aryl group containing a hydrophilic group, a hydrophilic heterocyclic group (e.g., pyridyl, furyl, morpholino) and an alkoxy group containing 3 or less carbon atoms.

$R^{3B}$ represents a halogen atom (e.g., chlorine, fluorine), an alkoxy group (e.g., methoxy, methoxyethoxy), an amino group (e.g., methylamino group, dimethylamino group), an alkylthio group (e.g., methylthio, ethylthio), an aryloxy group (e.g., 2-carboxyphenoxy, 4-carboxyphenoxy), an acylamino group (e.g., acetylamino, 2-carboxypropionylamino), an aryl group (e.g., 2-carboxyphenyl, 4-carboxyphenyl) or a heterocyclic group (e.g., 4-pyridyl, 2-pyridyl, morpholino). Particularly preferred among these groups are a halogen atom, an alkoxy group, an alkylthio group, an acylamino group and a heterocyclic group.

It is preferred that Dye contains no hydrophobic group which inhibits the diffusion of a dye but contains a water-soluble group which accelerates the diffusion of a dye.

Essentially, X may be bonded to any position in Dye. Typical examples of the connecting group represented by X include a group represented by

(in which $R^5$ represents a hydrogen atom, alkyl group or substituted alkyl group), —SO$_2$—, —CO—, alkylene group, substituted alkylene group, phenylene group, substituted phenylene group, naphthylene group, substituted naphthylene group, —O—, —SO— and a group obtained by combining two or more of these divalent residual groups. Preferred among these groups are groups represented by —NR$_5$—SO$_2$—, —NR$_5$—CO— and —R$_6$—(L)$_k$—(R$_7$)$_l$— in which R$_6$ and R$_7$ each represents an alkylene group, substituted alkylene group, phenylene group, substituted phenylene group, naphthylene group or substituted naphthylene group, L represents —O—, —CO—, —SO—, —SO$_2$—, —SO$_2$NH—, —NHSO$_2$—, —CONH— or —NHCO—, k represents an integer 0 or 1, and l represents 0 when k=0, and l represents 0 or 1 when k=1.

Another preferred example of the connecting group is a combination of —NR$_5$—SO$_2$— and —NR$_5$—CO— or —R$_6$ — (L)$_k$—(R$_7$)—.

Examples of the particularly preferred form in which Dye and Y are bonded to each other is Dye—SO$_2$NH—Y as well as Dye—CONH—Y, Dye—NHSO$_2$—Y, Dye—NHCO—Y, Dye—NHCOO—Y and Dye—NHCONH—Y.

The present invention will be further described with reference to Y.

Y is selected such that the compound represented by the general formula (I) undergoes oxidation and cleavage upon development to form a nondiffusive image-forming compound which provides a diffusive dye.

An effective example of Y for this type of a compound is an N-substituted sulfamoyl group. Examples of Y include a group represented by the general formula (YI):

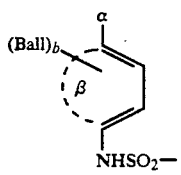

(YI)

wherein $\beta$ represents a nonmetallic atomic group required for the formation of a benzene ring to which carbon rings or heterocyclics may be condensed to form a naphthalene ring, quinoline ring, 5,6,7,8-tetrahydronaphthalene ring, chroman ring or the like; $\alpha$ represents a group represented by —OG$^{11}$ or —NHG$^{12}$ in which G$^{11}$ represents a hydrogen atom or a group which undergoes hydrolysis to form a hydroxyl group and G$^{12}$ represents a hydrogen atom, a C$_{1-22}$ alkyl group or a group which renders NHG$^{12}$ hydrolyzable; Ball represents a ballast group; and b represents an integer 0, 1 or 2.

Specific examples of this type of group represented by Y are described in JP-A-48-33826 and 53- 50736 (The term "JP-A" as used herein means an "unexamined published Japanese patent application").

Another example of Y suitable for the above described type of compound is a group represented by the general formula (YII):

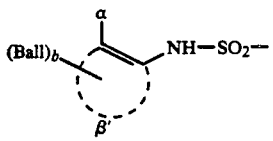

(YII)

wherein Ball, $\alpha$ and b are as defined in the general formula (YI); and $\beta'$ represents an atomic group required for the formation of a benzene ring to which carbon rings or heterocyclics may be condensed to form a naphthalene ring, quinoline ring, 5,6,7,8-tetrahydronaphthalene ring, chroman ring or the like.

Specific examples of this type of group represented by Y are described in JP-A-51-113624, 56-12642, 56-16130, 56-16131, 57-4043 and 57-650 and U.S. Pat. No. 4,053,312.

A further example of Y suitable for the above described type of compounds is a group represented by the general formula (YIII):

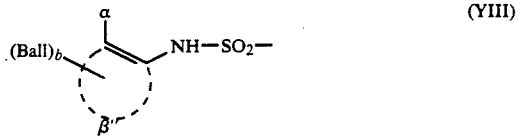

(YIII)

wherein Ball, $\alpha$ and b are as defined in the general formula (YI); and $\beta''$ represents an atomic group required for the formation of a heterocyclic group such as a pyrazole ring or pyridine ring to which carbon rings or heterocyclic rings may be bonded. Specific examples of this type of group represented by Y are described in JP-A-51-104343.

A further example of Y suitable for the above described type of compounds is a compound represented by the general formula (YIV):

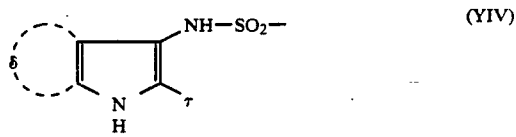

(YIV)

wherein $\tau$ preferably represents a hydrogen atom, substituted or unsubstituted alkyl group, aryl group or heterocyclic group or —CO—G$^{21}$ in which G$^{21}$ represents —OG$^{22}$, —S—G$^{22}$ or

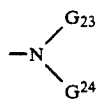

(wherein G$^{22}$ represents a hydrogen atom, alkyl group, cycloalkyl group or aryl group, G$^{23}$ has the same meaning as G$^{22}$ or represents an aliphatic group, an aromatic carboxylic acid or an acyl group derived from sulfonic acid, and G$^{24}$ represents a hydrogen atom or unsubstituted or substituted alkyl group); and $\delta$ represents a residual group required for the completion of a condensed benzene ring.

Specific examples of this type of compound represented by Y are described in JP-A-51-104343, 53-46730, 54-130122 and 57-85055.

A further example of Y suitable for the above described type of compounds is a group represented by the general formula (YV):

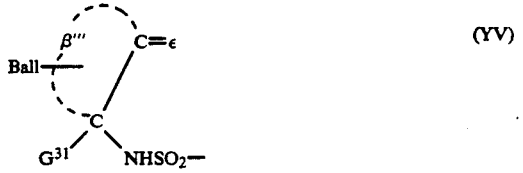

(YV)

wherein Ball is as defined in the general formula (YI); $\epsilon$ represents an oxygen atom or NG$^{32}$ (in which G$^{32}$ represents a hydroxyl group or an amino group which may be substituted)(in this case, examples of the compound represented by H$_2$N—G$^{32}$ include hydroxylamine, hydrazines, semicarbazides and thiosemicarbazides); $\beta'''$ represents an atomic group required for the formation of a 5-, 6- or 7-membered saturated or unsaturated non-aromatic hydrocarbon ring; and G$^{31}$ represents a hydrogen atom or a halogen atom such as fluorine, chlorine or bromine. Specific examples of this type of compound represented by Y are described in JP-A-53-3819 and 54-48534.

Specific examples of this type of compound represented by Y include those described in JP-B-48-32129 and 48-39165 (The term "JP-B" as used herein means an "examined Japanese patent publication"), JP-A-49-64436, and U.S. Pat. No. 3,443,934.

A further example of Y of the present invention is a group represented by the general formula (Y VI):

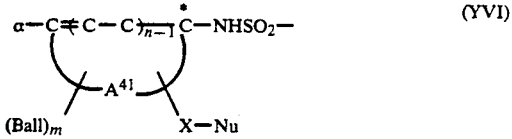

wherein $\alpha$ represents $OR^{41}$ or $NHR^{42}$ in which $R^{41}$ represents a hydrogen atom or a hydrolyzable component and $R^{42}$ represents a hydrogen atom, a $C_{1-50}$ alkyl group or a group which renders $NHR^{42}$ hydrolyzable; $A^{41}$ represents an atomic group required for the formation of an aromatic group; Ball represents an organic immobile group which exists on the aromatic group; m represents an integer 1 or 2 (when m is 2, the two (Ball)'s may be the same or different); X represents a divalent organic group constituting of 1 to 8 atoms (the nucleophilic group Nu and an electrophilic center (carbon atom with * mark) produced by oxidation thereof together form a 5- to 12-membered ring); Nu represents a nucleophilic group; and n represents an integer 1 or 2. Specific examples of this type of group represented by Y are described in JP-A-57-20735.

A further example of a compound of the type represented by the general formula (I) is a nondiffusive image-forming compound which undergoes cleavage in the presence of a base to release a diffusive dye but doesn't substantially release a dye upon reaction with an oxidation product of a developing agent.

An example of Y suitable for this type of a compound is a group represented by the general formula (YVII):

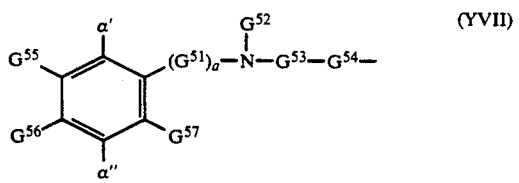

wherein $\alpha'$ represents an oxidizable nucleophilic group such as a hydroxyl group, primary or secondary amino group, hydroxyamino group and sulfonamide or precursor thereof; $\alpha''$ has the same meaning as $\alpha'$ or represents a dialkylamino group; $G^{51}$ represents a $C_{1-3}$ alkylene group; a represents an integer 0 or 1; $G^{52}$ represents a $C_{1-4}$ substituted or unsubstituted alkyl group or $C_{6-40}$ substituted or unsubstituted aryl group; $G^{53}$ represents a nucleophilic group such as —CO— or —CS—; $G^{54}$ represents an oxygen atom, sulfur atom, selenium atom or nitrogen atom (if $G^{54}$ is a nitrogen atom, it may be substituted by a hydrogen atom, $C_{1-10}$ alkyl group or substituted alkyl group or $C_{6-20}$ aromatic residual group); and $G^{55}$, $G^{56}$ and $G^{57}$ each has the same meaning as $G^{52}$ or each represents a hydrogen atom, halogen atom, carbonyl group, sulfamyl group, sulfonamide group or $C_{1-40}$ alkyloxy group ($G^{55}$ and $G^{56}$ may together form a 5- to 7-membered ring).

$G^{56}$ may represent:

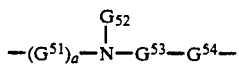

At least one of $G^{52}$, $G^{55}$, $G^{56}$ and $G^{57}$ represents a ballast group. Specific examples of this type of group represented by Y are described in JP-A-51-63618.

Further examples of Y suitable for the above described type of compounds are groups represented by the general formulae (Y VIII) and (Y IX):

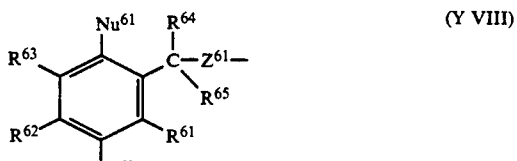

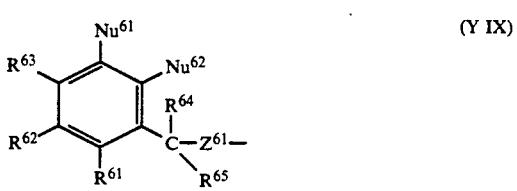

wherein $Nu^{61}$ and $Nu^{62}$ may be the same or different and each represents a nucleophilic group or precursor thereof; $Z^{61}$ represents a divalent atomic group which exhibits electronegative to the carbon atom at which a hydrogen atom is substituted by $R^{64}$ and $R^{65}$; $R^{61}$, $R^{62}$ and $R^{63}$ each represents a hydrogen atom, halogen atom, alkyl group, alkoxy group or acylamino group or $R^{61}$ and $R^{62}$ together form a condensed ring with the rest of the molecule when they are adjacent to each other on the ring or $R^{62}$ and $R^{63}$ together form a condensed ring with the rest of the molecule when they are adjacent to each other on the ring; and $R^{64}$ and $R^{65}$ may be the same or different and each represents a hydrogen atom, hydrocarbon group or substituted hydrocarbon group. A sufficiently large ballast group (Ball) is present on at least one of the substituents $R^{61}$, $R^{62}$, $R^{63}$ and $R^{65}$ to render the above described compound immobile. Specific examples of this type of compound represented by Y are described in JP-A- 53-69033 and 54-130927.

A further example of Y suitable for the above described type of compounds is a group represented by the general formula (Y X):

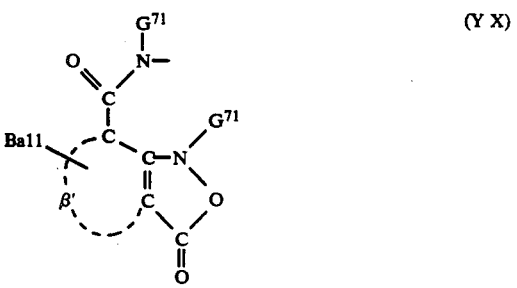

wherein Ball and $\beta'$ are as defined in the general formula (Y II); and $G^{71}$ represents an alkyl group or substituted alkyl group. Specific examples of this type of group represented by Y are described in JP-A-49-111628 and 52-4819.

Another type of compound represented by the general formula (I) is a nondiffusive image-forming compound which does not release a dye itself but releases a dye upon reaction with a reducing agent. In this case, a compound which mediates a redox reaction (so-called electron donor) is preferably used at the same time.

An example of Y suitable for this type of a compound is a group represented by the general formula (Y XI):

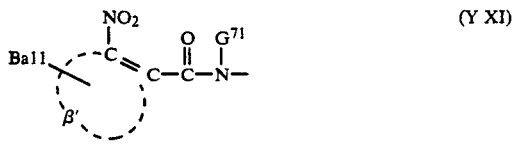

(Y XI)

wherein Ball and $\beta'$ are as defined in the general formula (Y II); and $G^{71}$ represents an alkyl group or substituted alkyl group. Specific examples of this type of compound represented by Y are described in JP-A-53-35533 and 53-11082.

Another example of Y suitable for the above described type of compounds is a group represented by the general formula (Y XII):

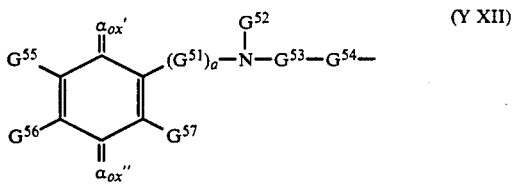

(Y XII)

All symbols in the general formula (Y XII) have the same meanings as in the general formula (Y VII).

Specific examples of this type of group represented by Y are described in JP-A-53-110827, and U.S. Pat. Nos. 4,356,249 and 4,358,525.

Further examples of Y suitable for the above described type of compounds are groups represented by the general formulae (Y XIIIA) and (Y XIIIB):

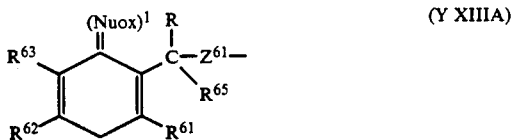

(Y XIIIA)

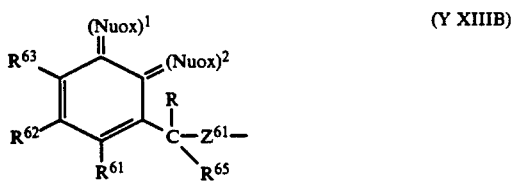

(Y XIIIB)

wherein (Nu ox)$^1$ and (Nu ox)$^2$ may be the same or different and each represents an oxidized nucleophilic group; and the rest of the symbols are as defined in the general formulae (Y VIII) and (Y IX). Specific examples of this type of group represented by Y are described in JP-A-54-130927 and 56-164342.

Examples of electron donors which can be used in combination with the groups represented by (Y XI), (Y XII), (Y XIIIA) and (Y XIIIB) are described in the patent specifications cited with reference to these groups.

Further preferred examples of such electron donors include compounds containing N—D bonds (in which D represents an oxygen atom, sulfur atom or nitrogen atom) and electrophilic groups in a single molecule as described in European Patent 220,746A, Kokai Giho 87-6199, and JP-A-63-201653 and 63-201654, compounds containing $SO_2$—D (in which D is as defined above) and electrophilic groups in a single molecule as described in JP-A-1-26842, compounds containing PO—D bonds (in which D is as defined above) and electrophilic groups in a single molecule as described in JP-A-63-271344, and compounds containing C—D' bonds (in which D' has the same meaning as D or represents —$SO_2$—) and electrophilic groups in a single molecule as described in JP-A-63-271341.

A particularly preferred example of Y suitable for the compound represented by the general formula (I) is a group represented by the general formula (Y XIV). Specific examples of this type of Y are described in JP-A-62-215270. In particular, groups represented by the general formula (Y XV) are preferably used in the present invention.

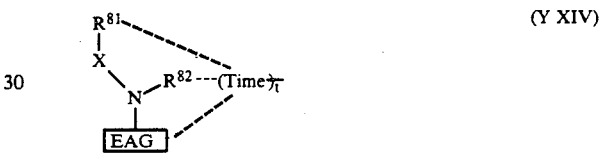

(Y XIV)

wherein EAG represents a group which receives electrons from a reducing substance; N represents a nitrogen atom; $R^{81}$ and $R^{82}$ each represents a substituent other than hydrogen atom (if $R^{81}$ or $R^{82}$ is bonded to —Time—$_t$, it represents a mere bond or substituent other than hydrogen atom) and $R^{81}$ and $R^{82}$ may be bonded to each other to form a ring; X represents —O—, —S— or

(in which $R^5$ is as defined above) (—O— is particularly preferred); Time represents a group which undergoes a reaction triggered by the cleavage of a nitrogen-oxygen single bond to release Dye; t represents an integer 0 or 1; the solid line indicates a bond; and the broken line indicates that (Time)$_t$ is bonded to at least one of $R^{81}$, $R^{82}$ and EAG.

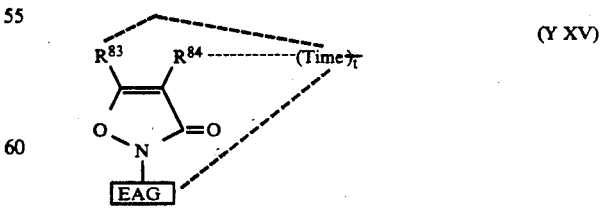

(Y XV)

wherein $R^{83}$ and $R^{84}$ each represents a mere bond, hydrogen atom or a group capable of substituting a hydrogen atom and may be bonded to each other to form a saturated or unsaturated carbon ring or heterocyclic. In general formula (Y XV), EAG, Time, and t have the same meaning as in general formula (Y XIV), and the broken line indicates that (Time)$_t$ is bonded to at least one of $R^{83}$, $R^{84}$ and EAG. In the general formulae (Y XIV) and (Y XV), a ballast group is preferably contained in the position of $R^{81}$ to $R^{84}$ or EAG.

The ballast group contained in the general formulae (Y I) to (Y XV) is an organic ballast group capable of rendering the dye-forming compound of the general formula (I) nondiffusive and preferably containing a $C_{8-32}$ hydrophobic group. Such an organic ballast group is bonded to the dye-forming compound directly or via a connecting group (e.g., imino bond, ether bond, thioether bond, carbonamide bond, sulfonamide bond, ureido bond, ester bond, carbamoyl bond, sulfamoyl bond, or a combination thereof).

Specific examples of the compound represented by formula (I) wherein Dye is represented by formula (II)A are shown hereafter by Compounds A(1) to A(31), but the present invention should not be construed as being limited thereto.

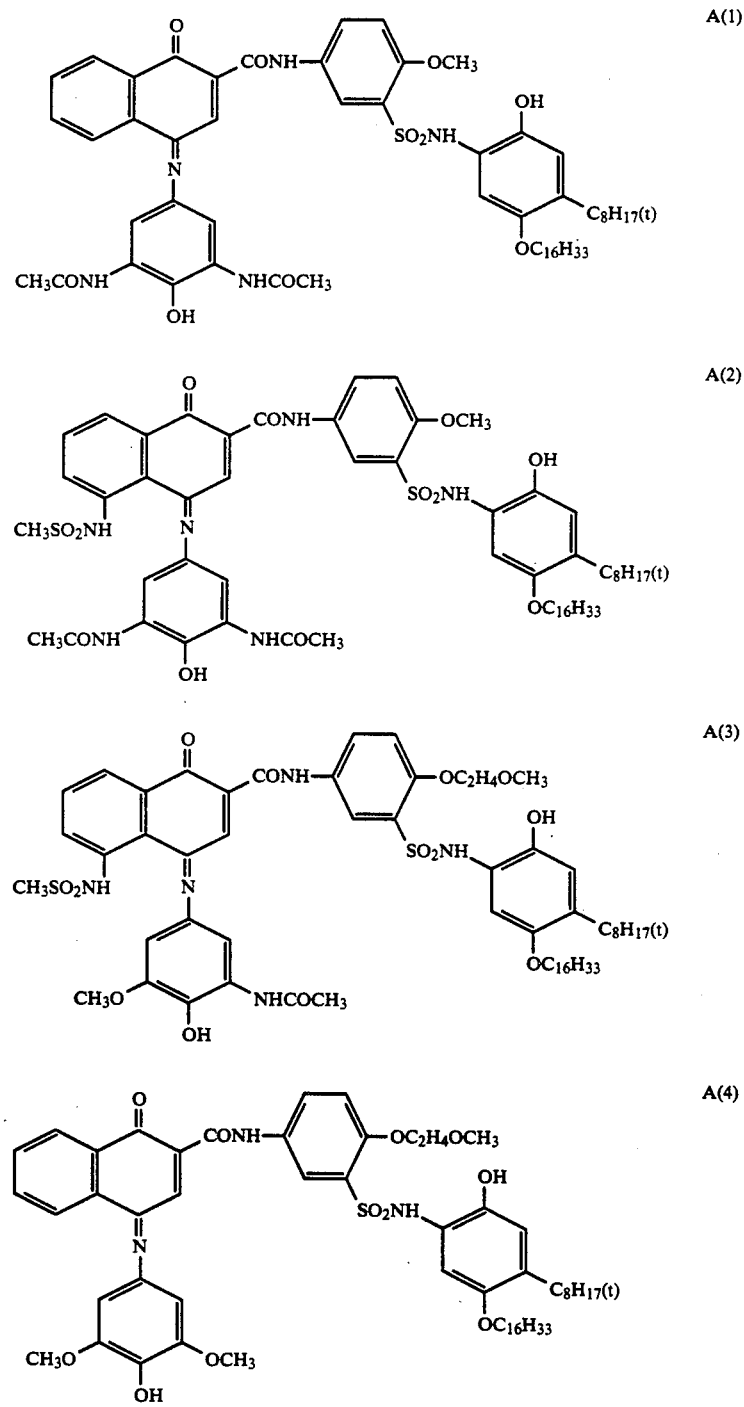

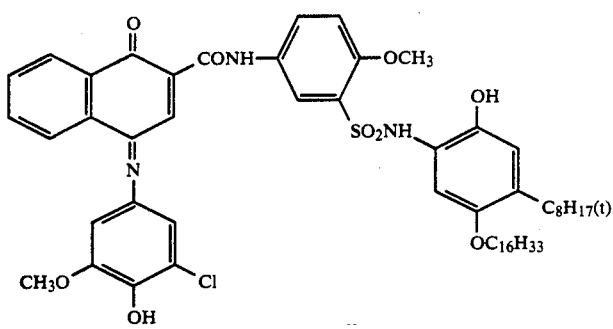
A(5)
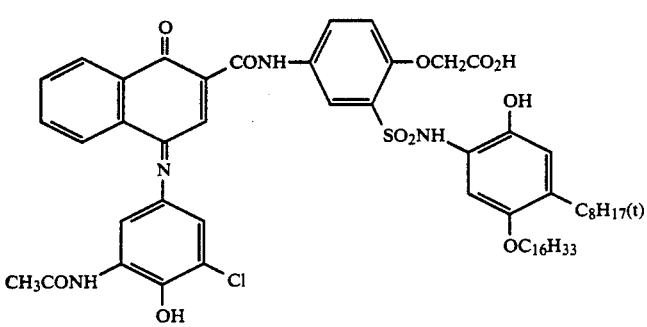
A(6)
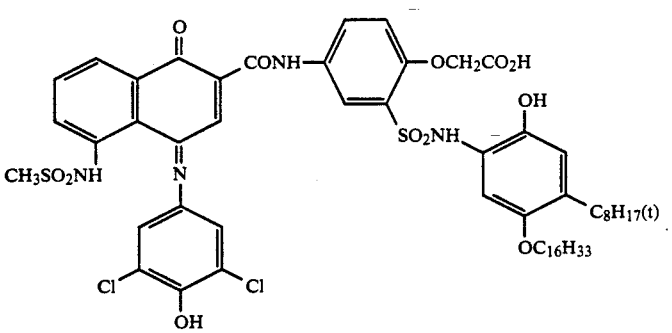
A(7)
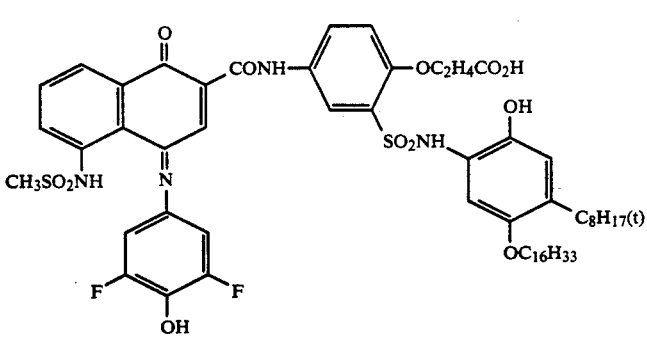
A(8)
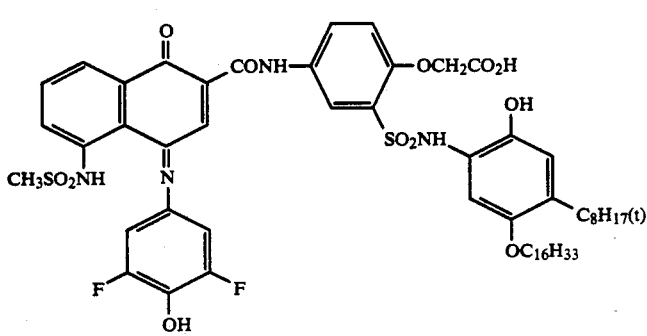
A(9)

-continued
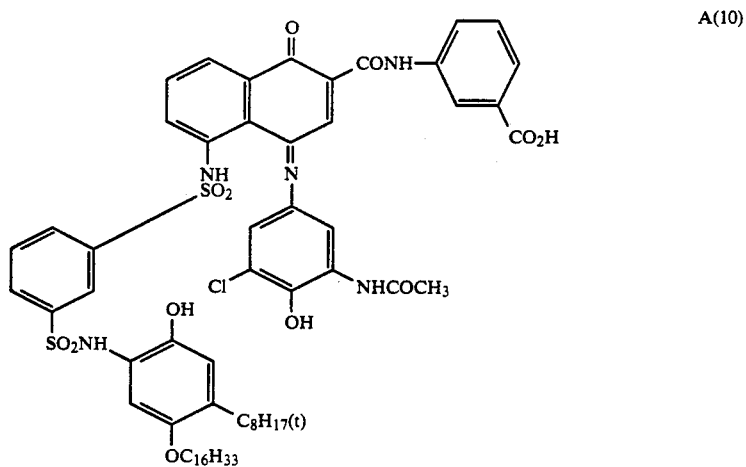
A(10)
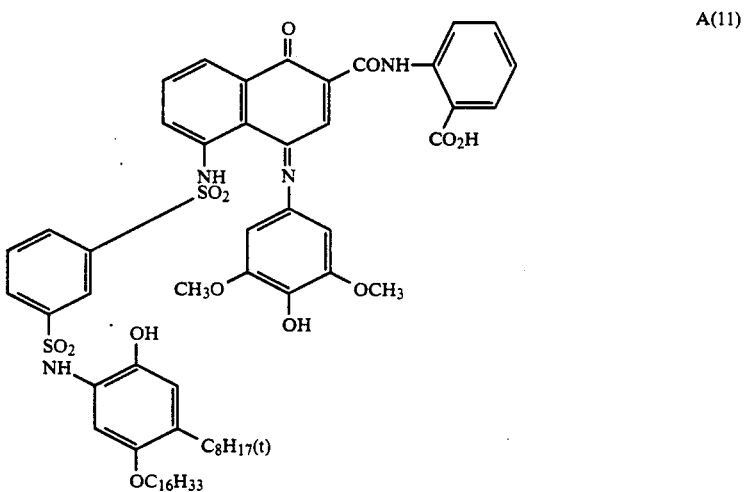
A(11)
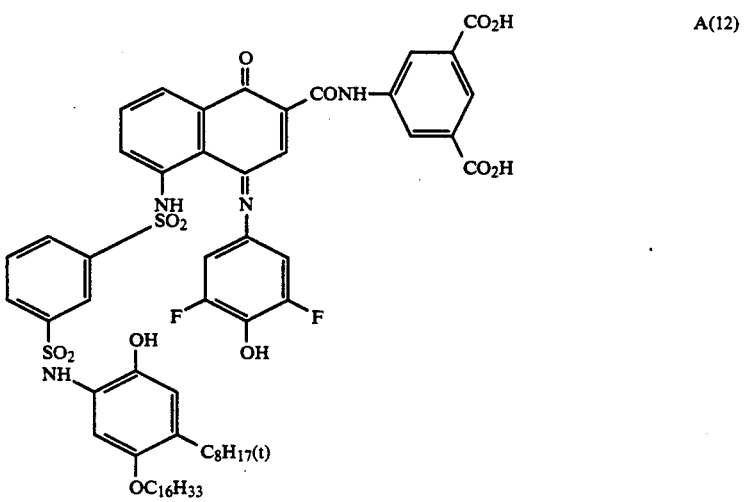
A(12)

-continued
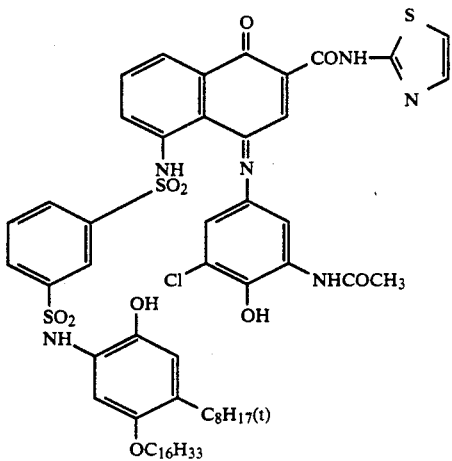
A(13)
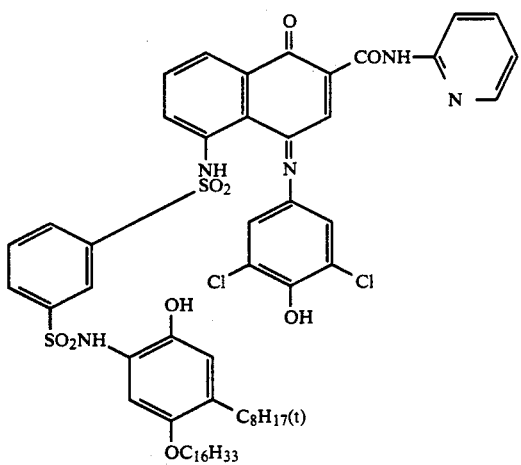
A(14)
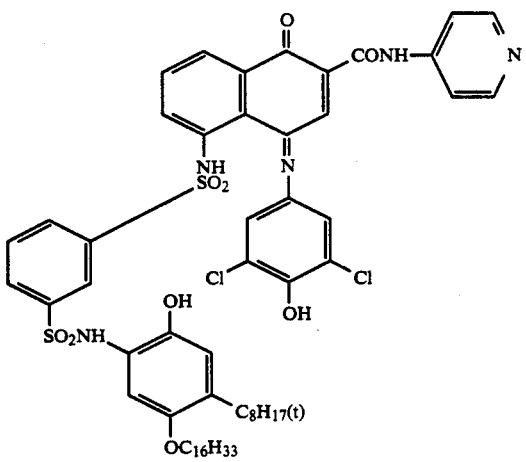
A(15)

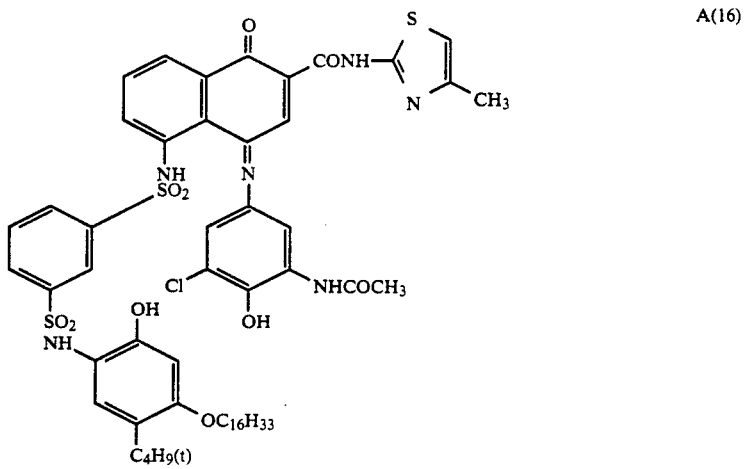
A(16)
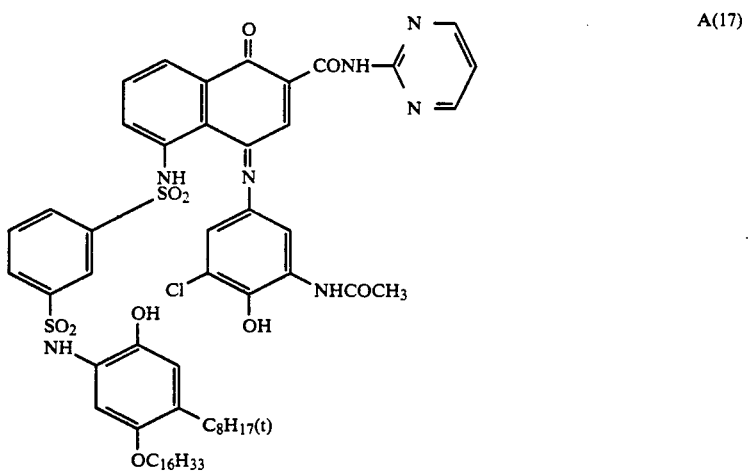
A(17)
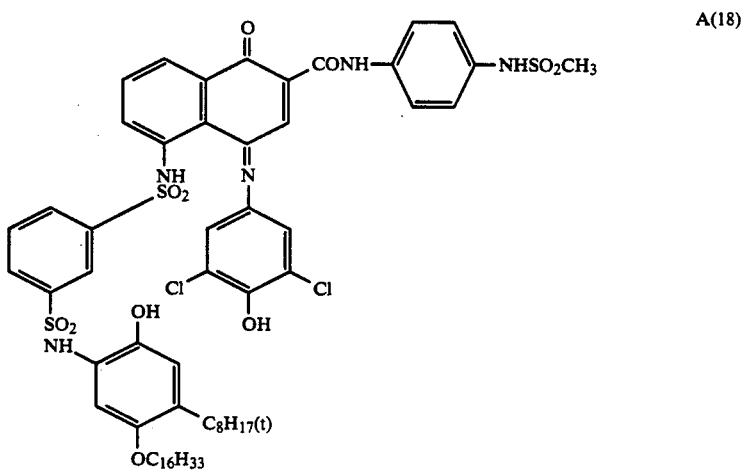
A(18)

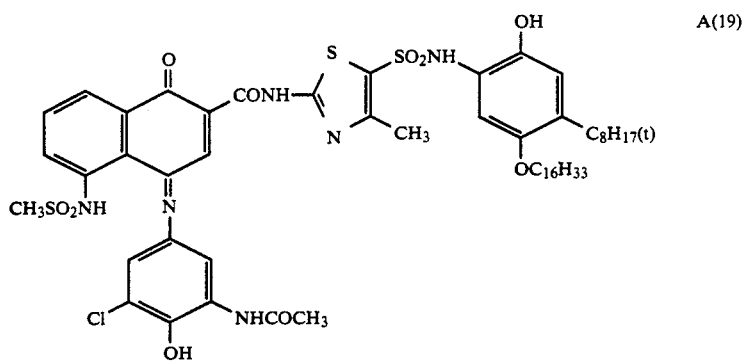
A(19)
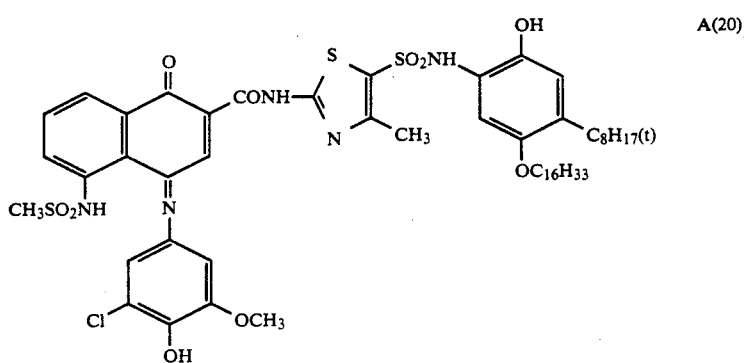
A(20)
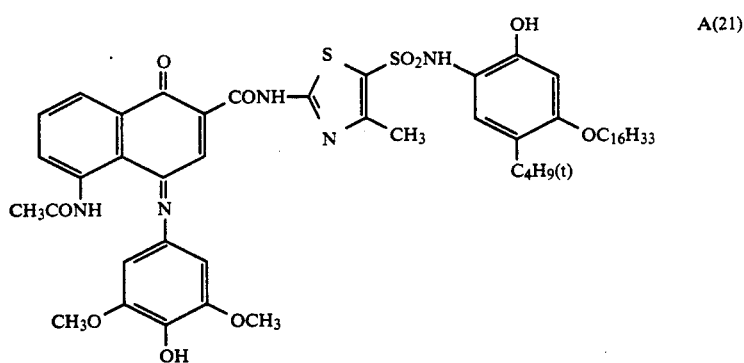
A(21)
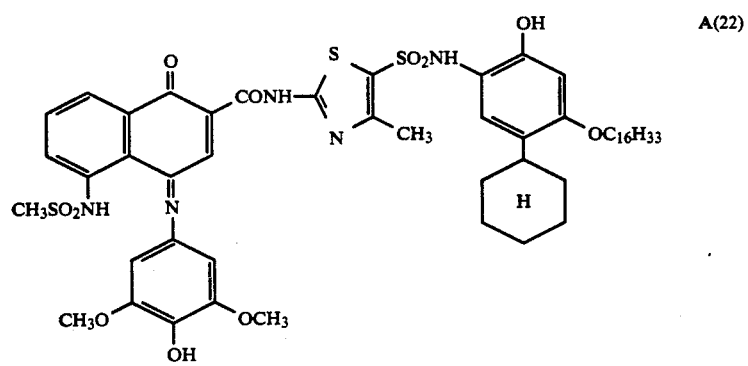
A(22)

-continued
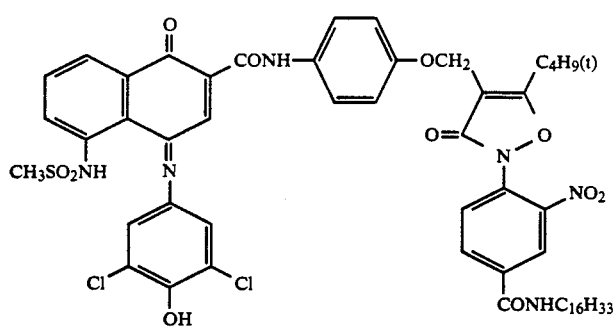
A(23)
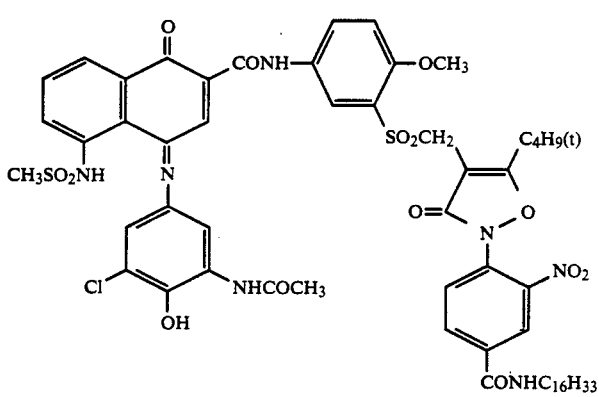
A(24)
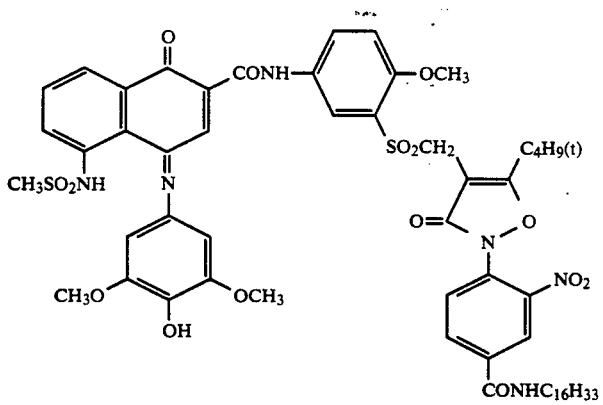
A(25)
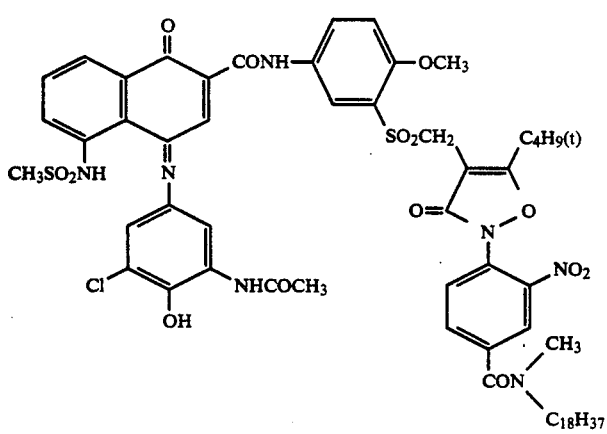
A(26)

-continued
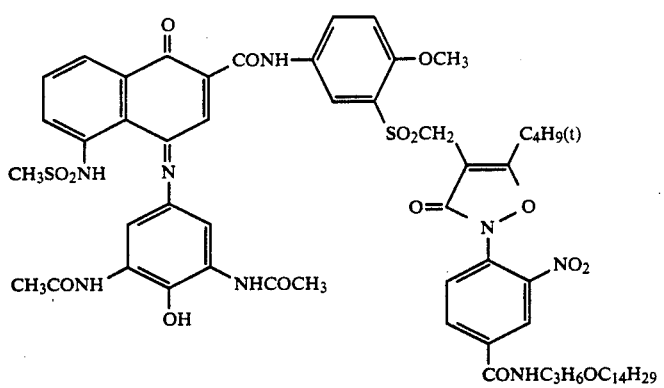
A(27)
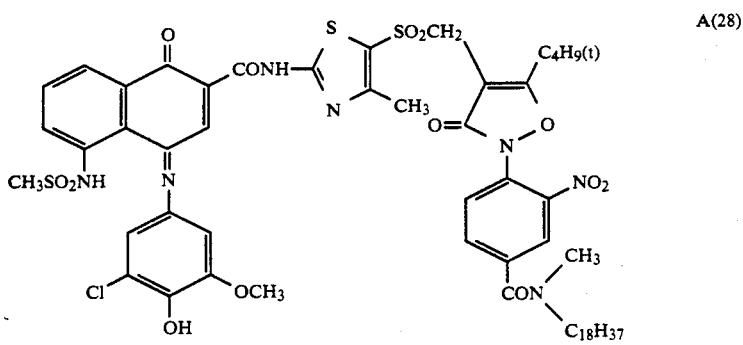
A(28)
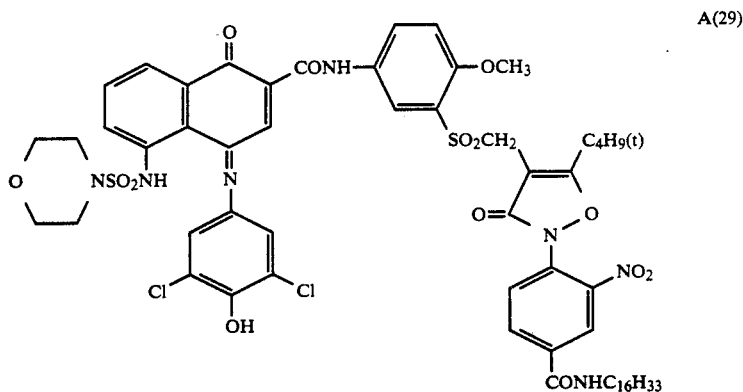
A(29)
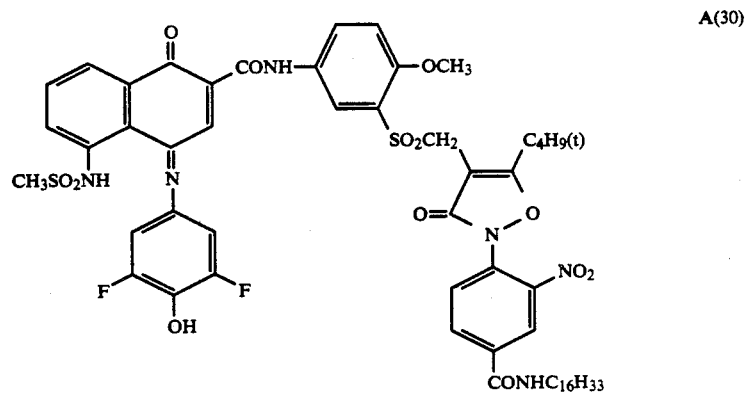
A(30)

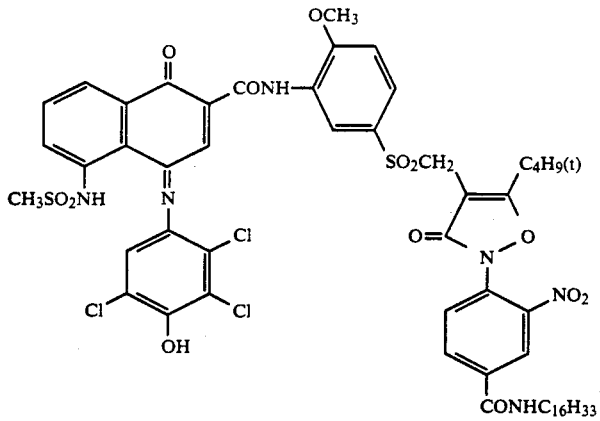
A(31)
Specific examples of the compound represented by formula (I) wherein Dye is represented by formula (II)B are shown hereafter by Compounds B(1) to B(32), but the present invention should not be construed as being limited thereto.
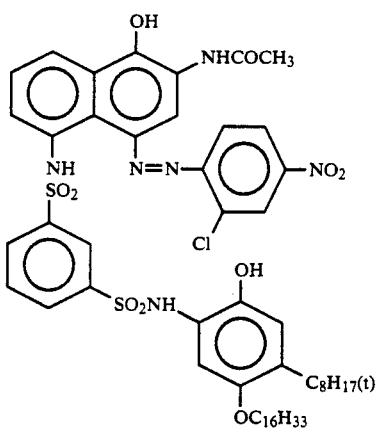
B(1)
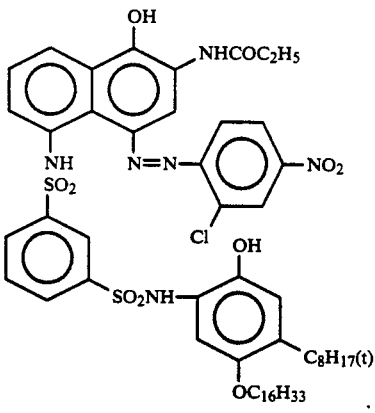
B(2)

B(3)
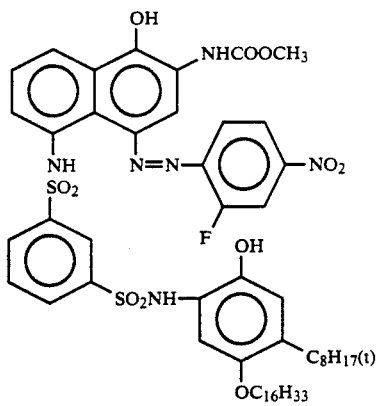
B(4)
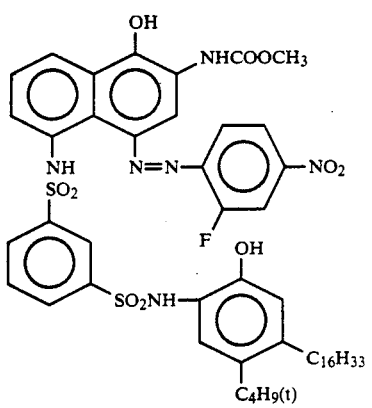
B(5)
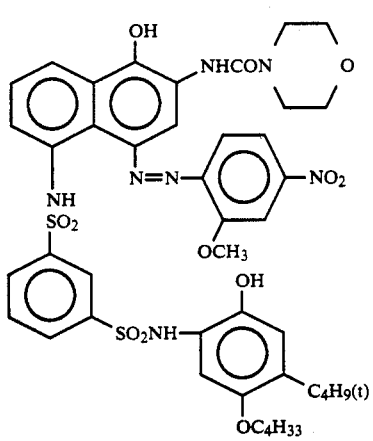
B(6)
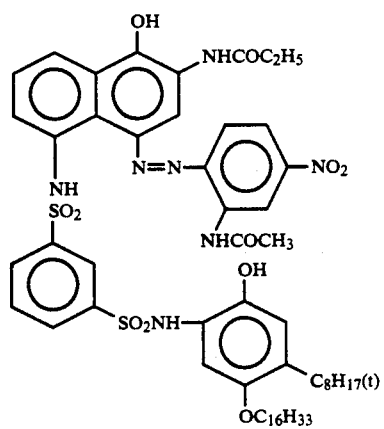

-continued
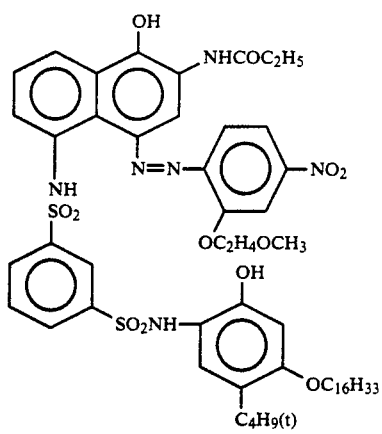
B(7)
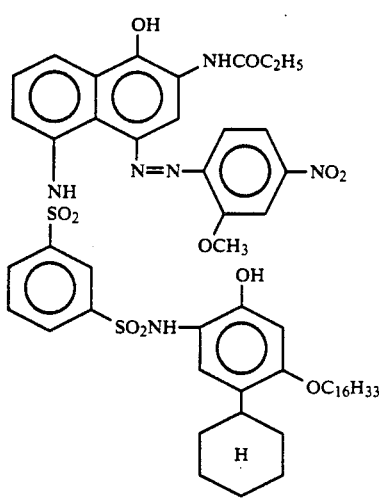
B(8)
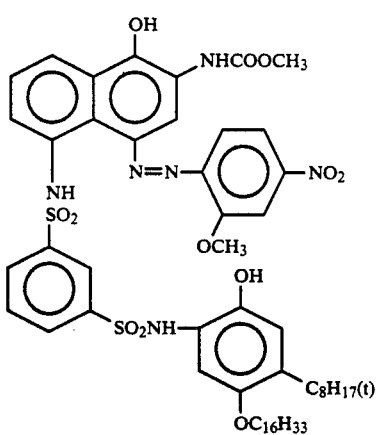
B(9)
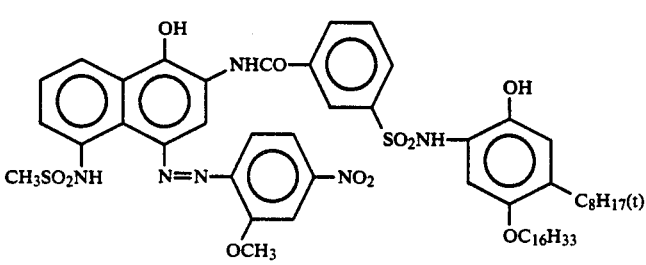
B(10)

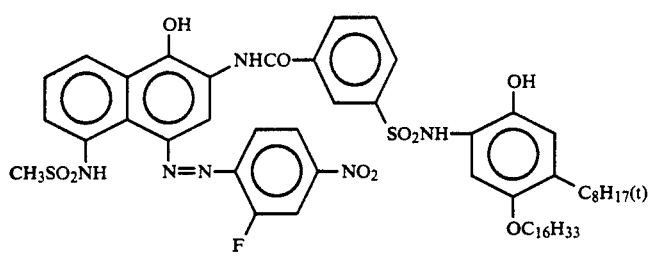
B(11)
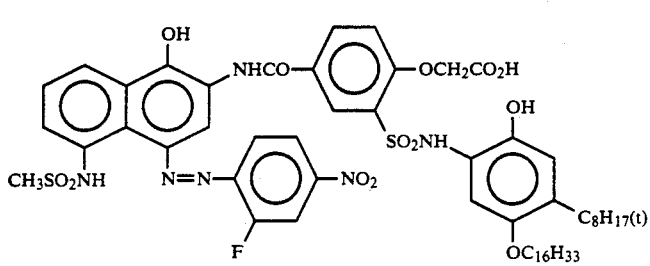
B(12)
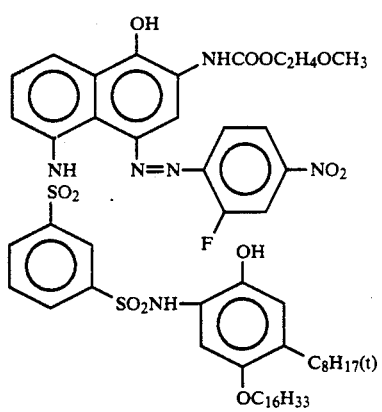
B(13)
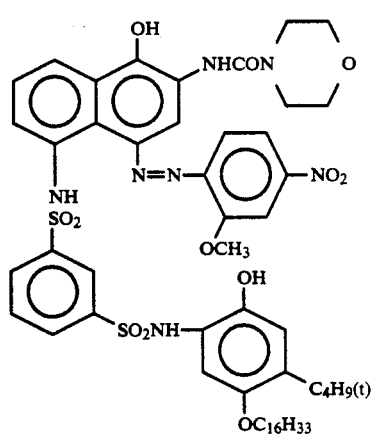
B(14)

-continued
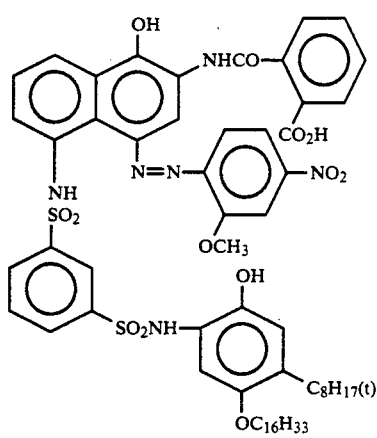
B(15)
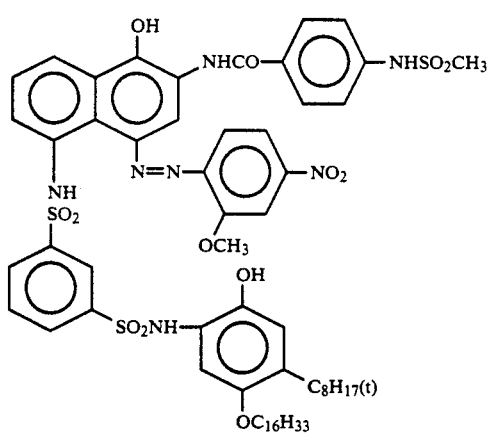
B(16)
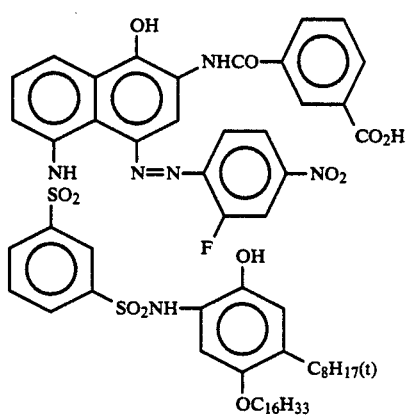
B(17)

-continued
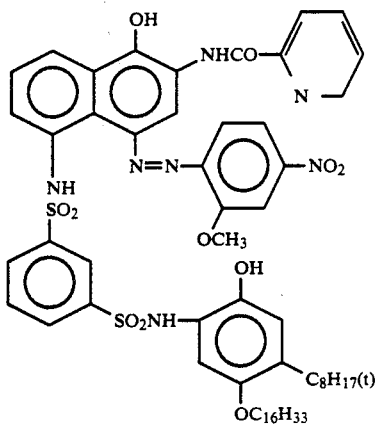
B(18)
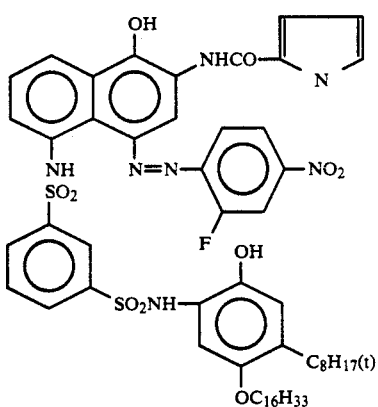
B(19)
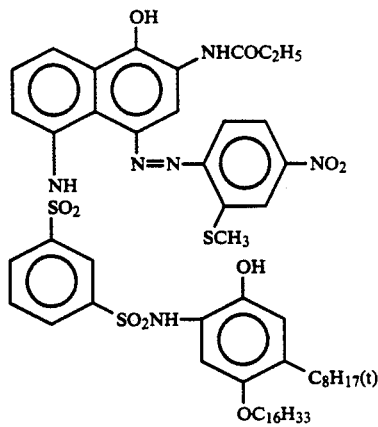
B(20)

B(21)
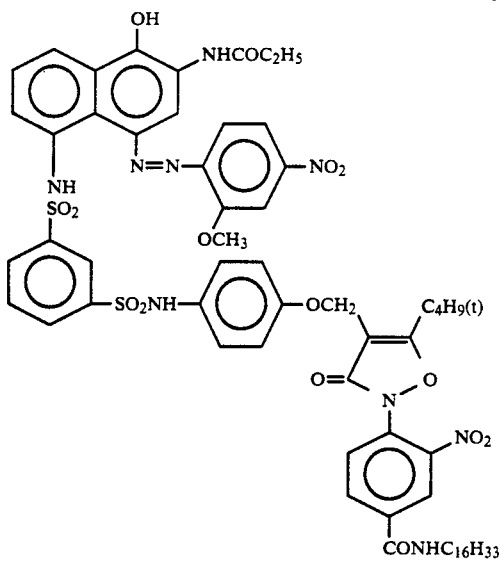
B(22)
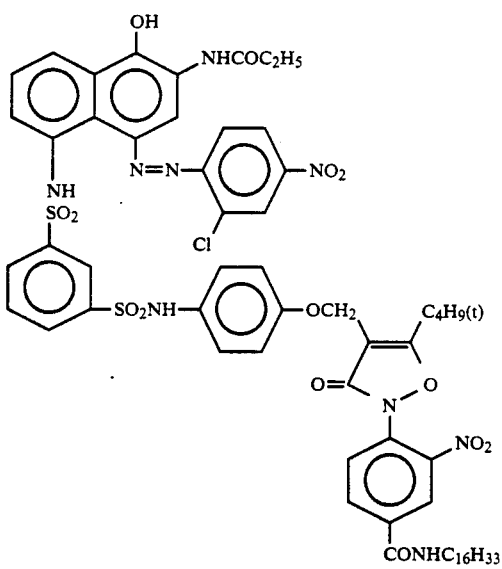
B(23)
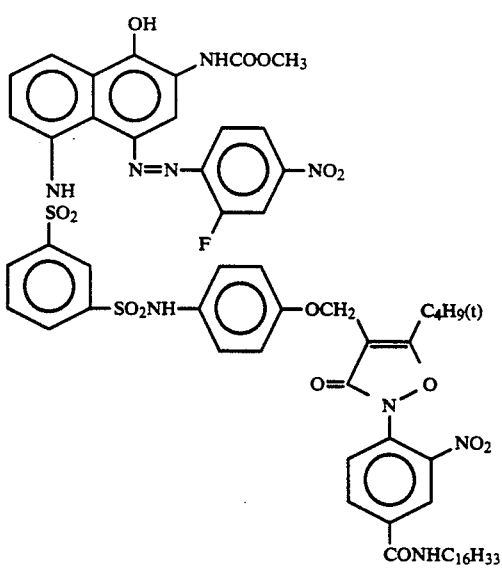

B(24)
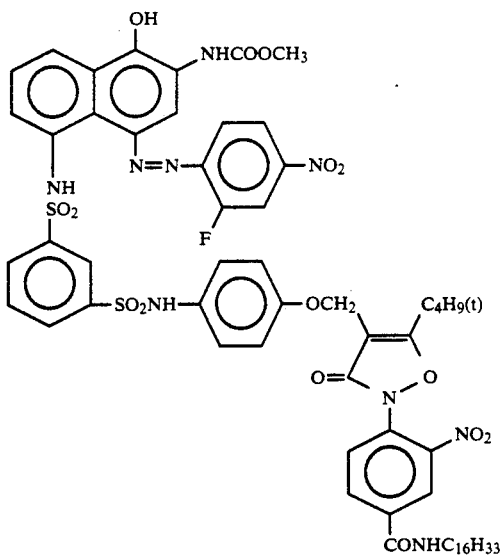
B(25)
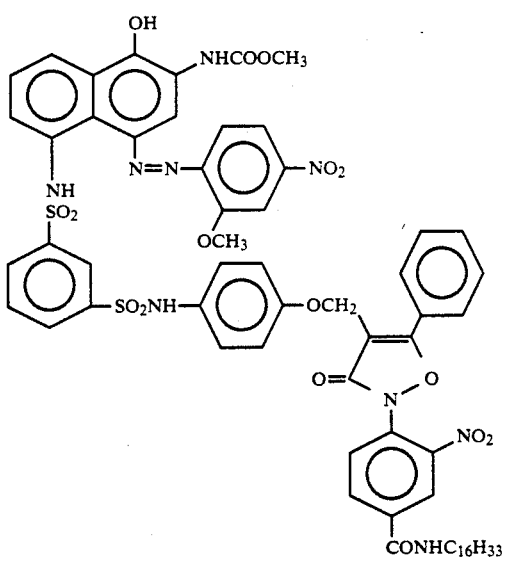
B(26)
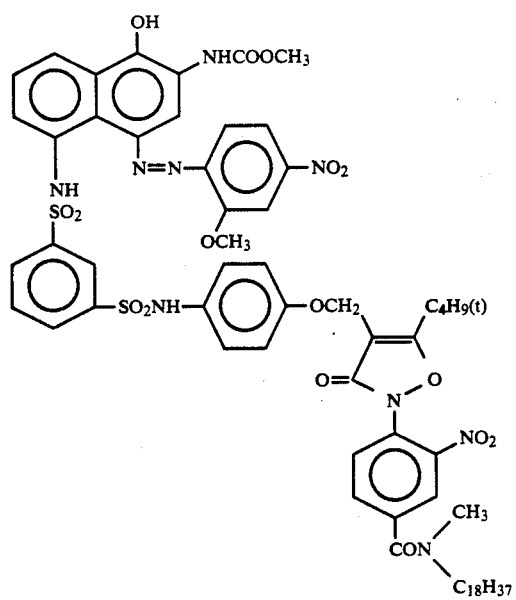

-continued
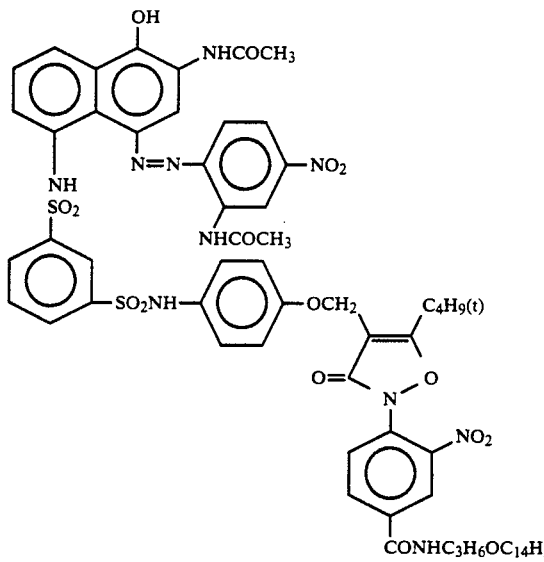
B(27)
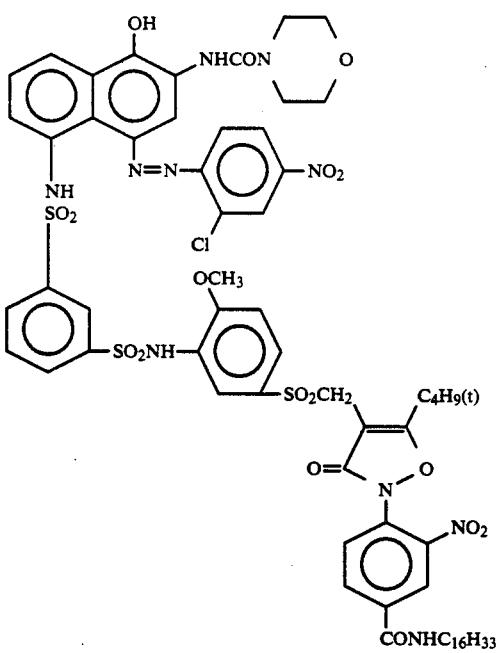
B(28)

-continued
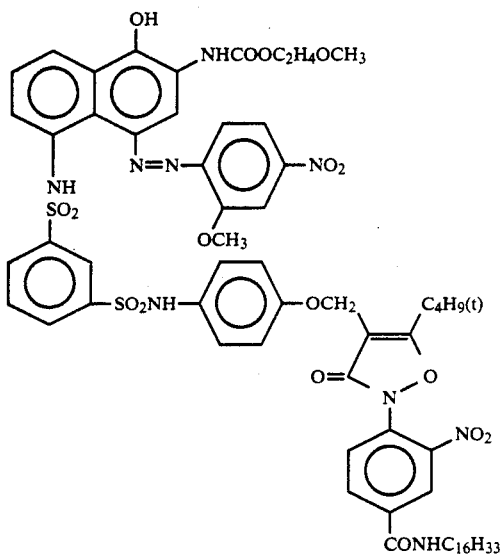
B(29)
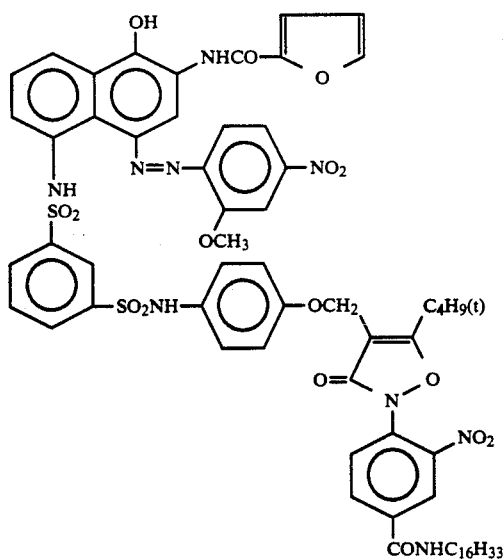
B(30)

B(31)
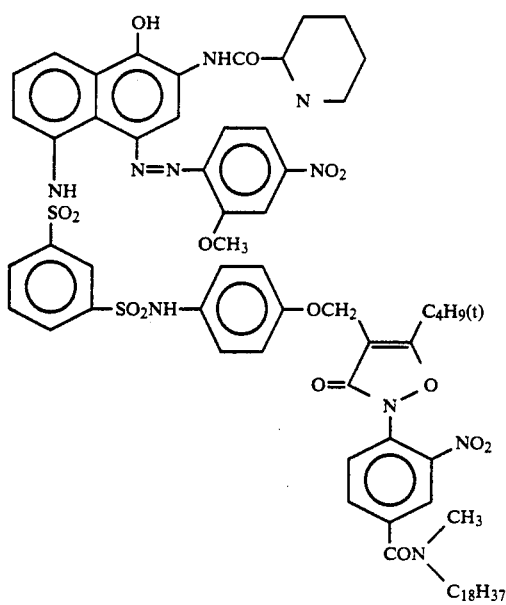
B(32)
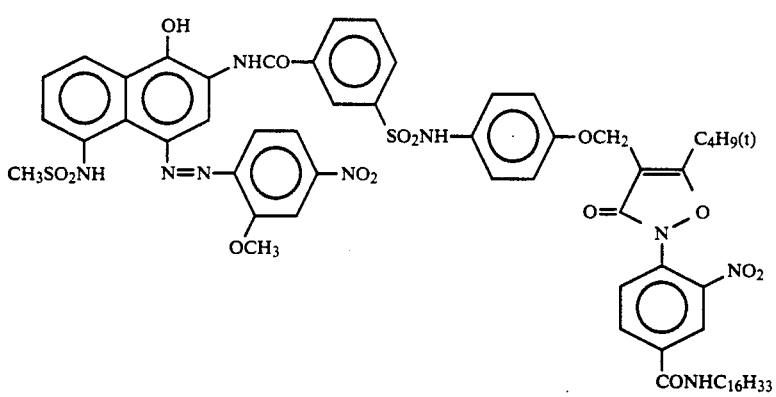
Specific examples of the compound represented by formula (I) wherein Dye is represented by formula (II)C are shown below by Compounds C(1) to C(30), but the present invention should not be construed as being limited thereto.
C(1)
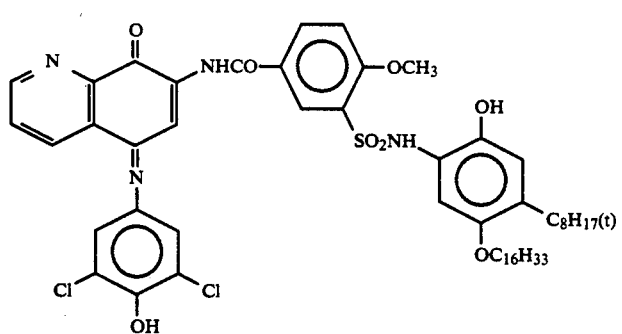

C(2)
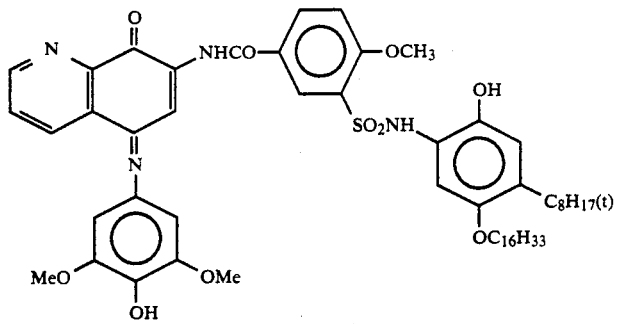
C(3)
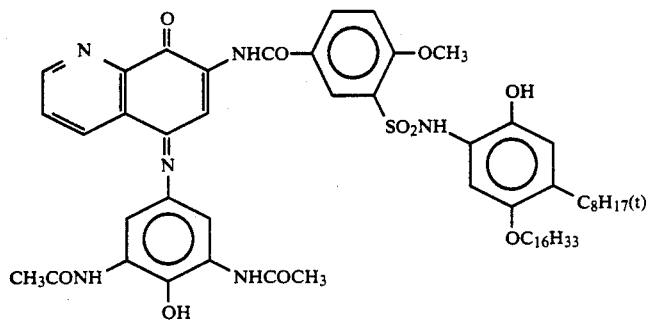
C(4)
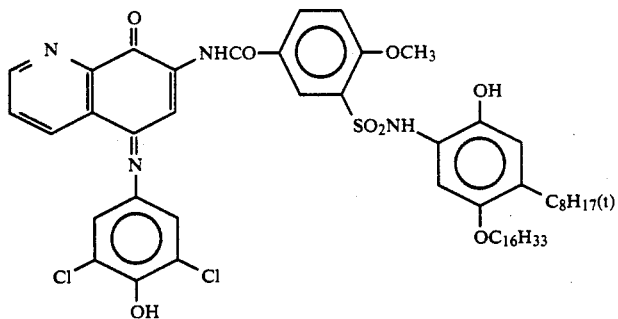
C(5)
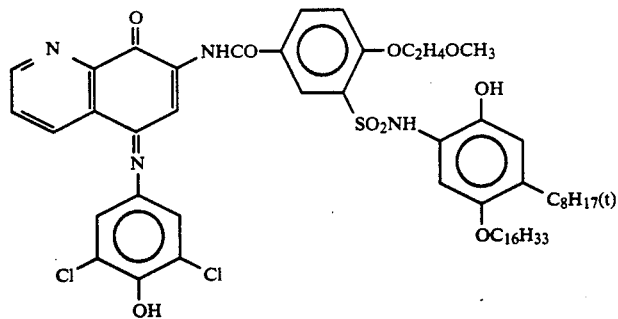
C(6)
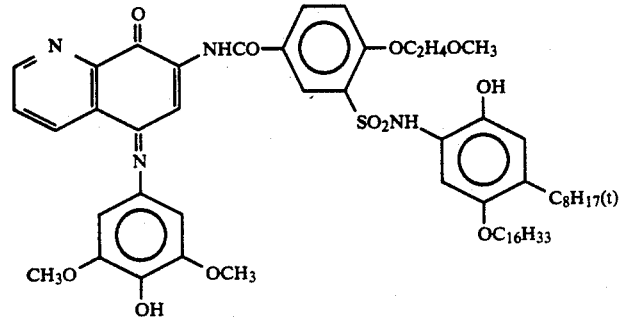

-continued
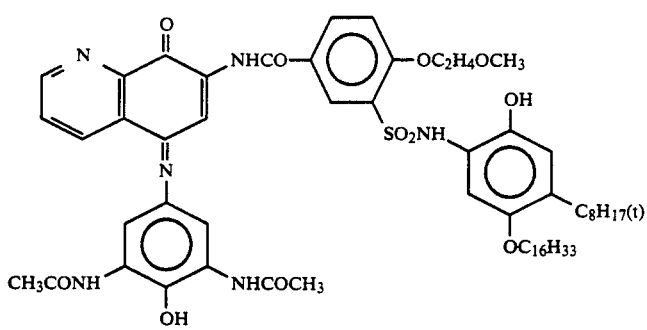
C(7)
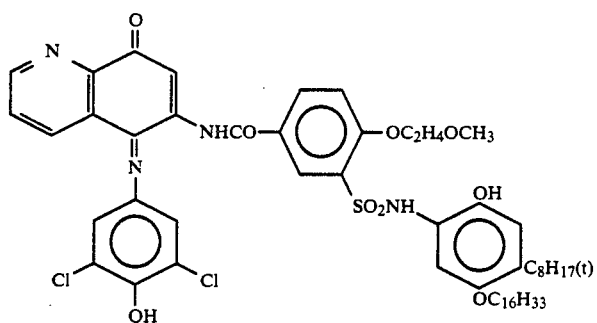
C(8)
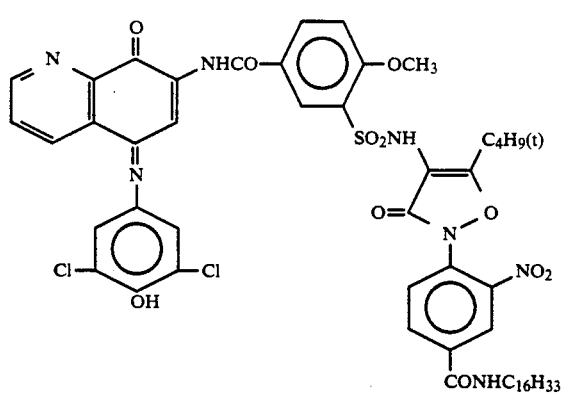
C(9)
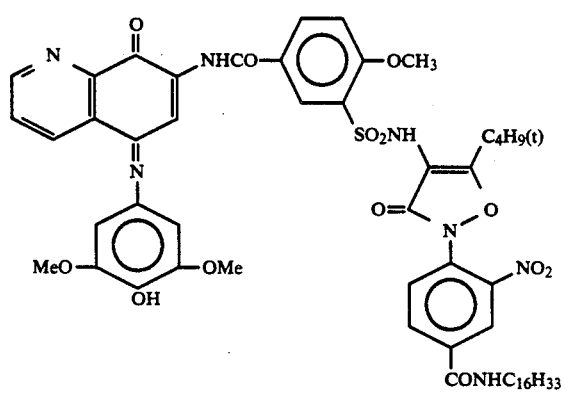
C(10)

-continued
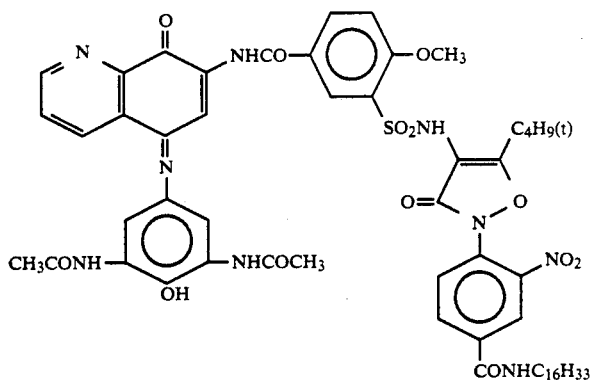
C(11)
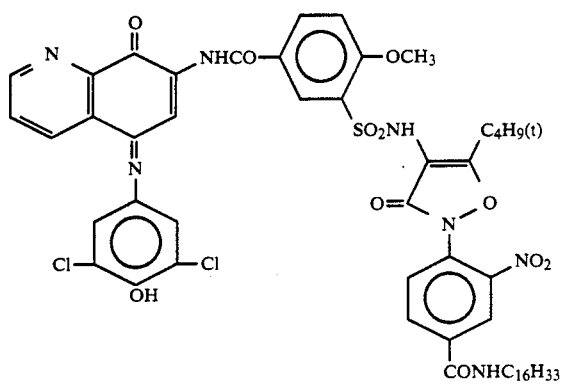
C(12)
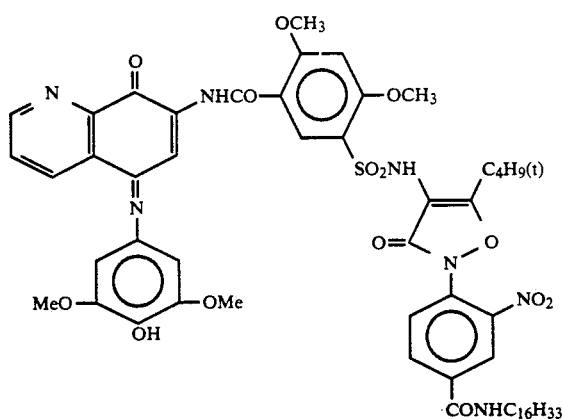
C(13)
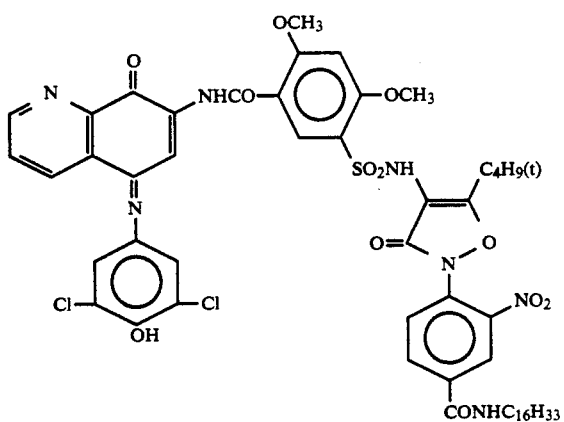
C(14)

-continued
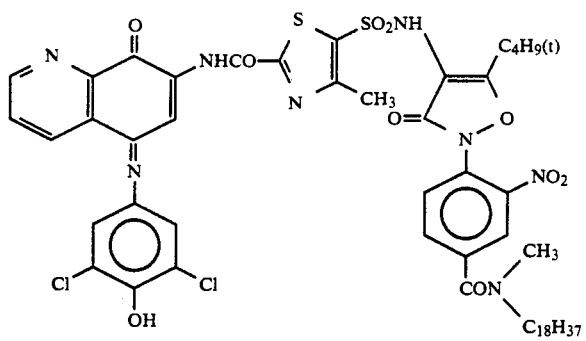
C(15)
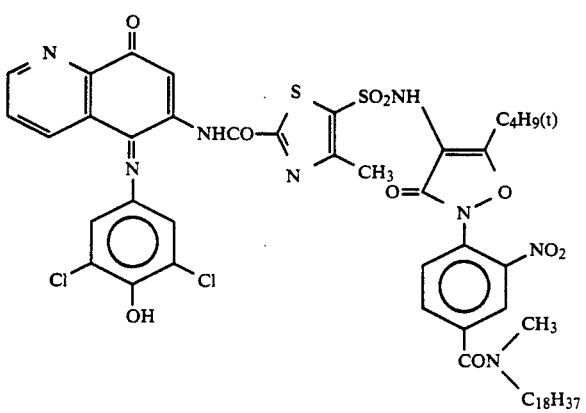
C(16)
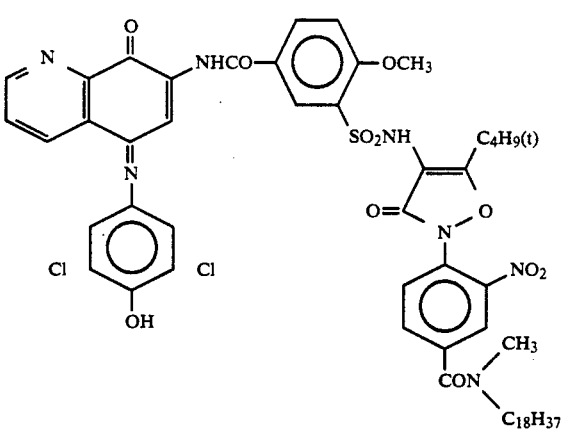
C(17)
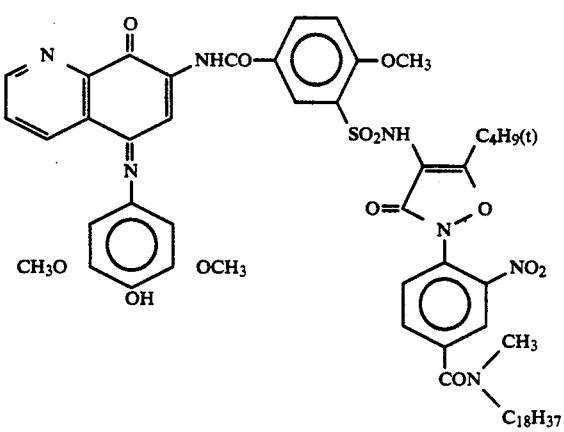
C(18)

-continued
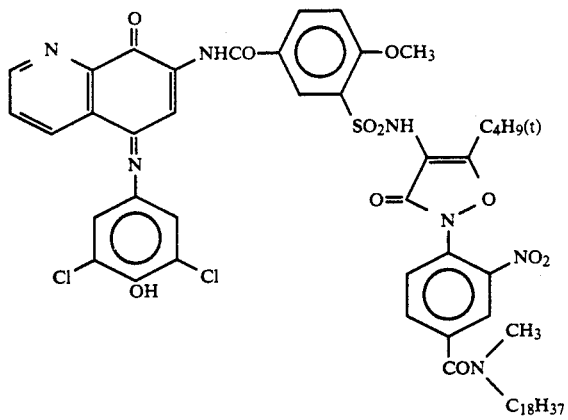
C(19)
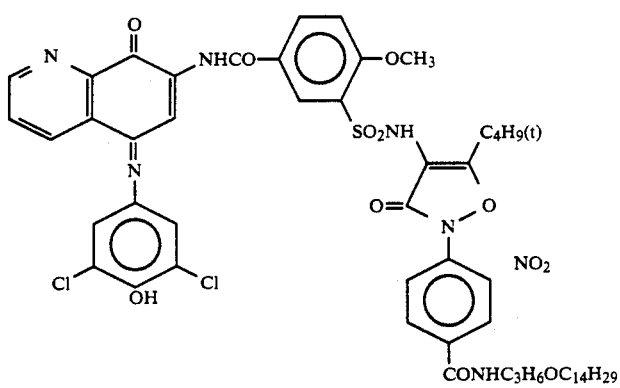
C(20)
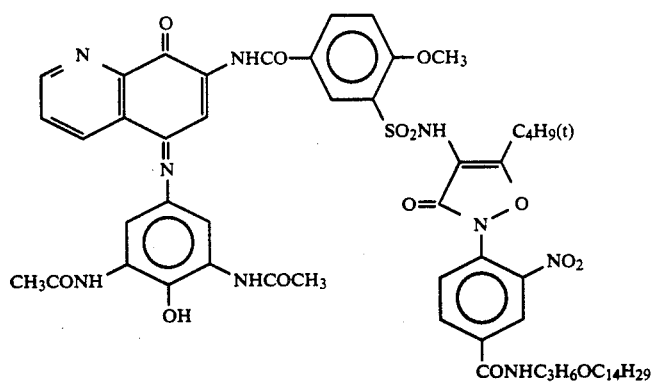
C(21)
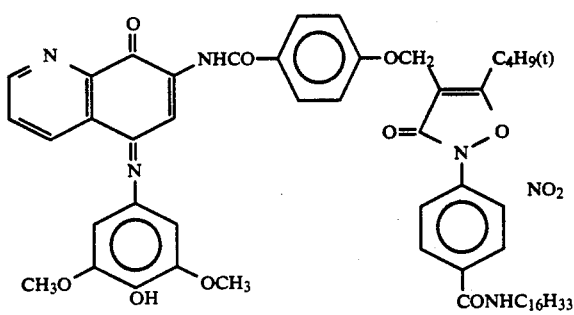
C(23)

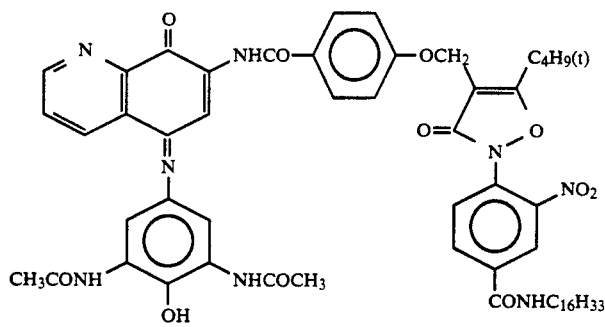
C(24)
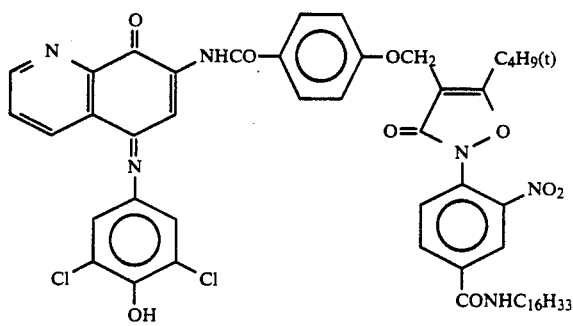
C(25)
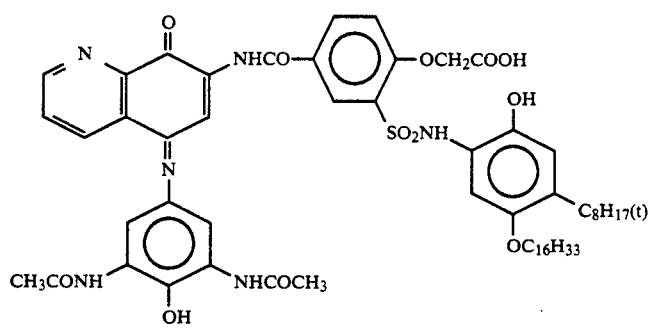
C(26)
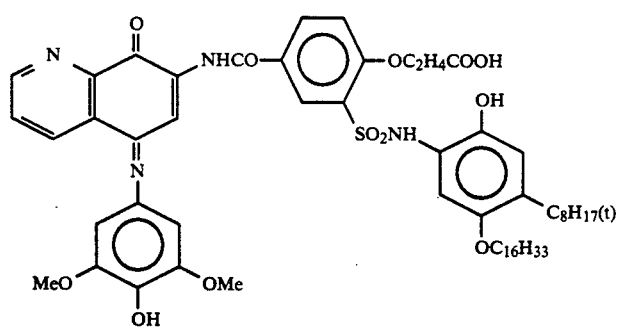
C(27)
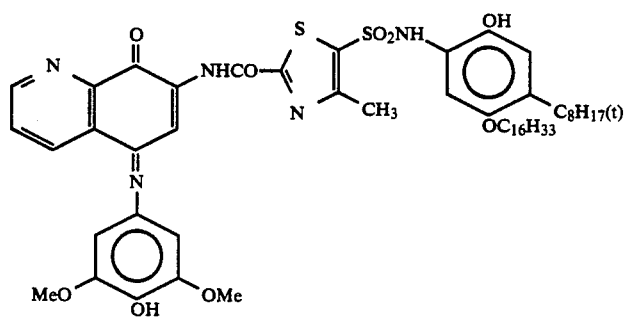
C(28)

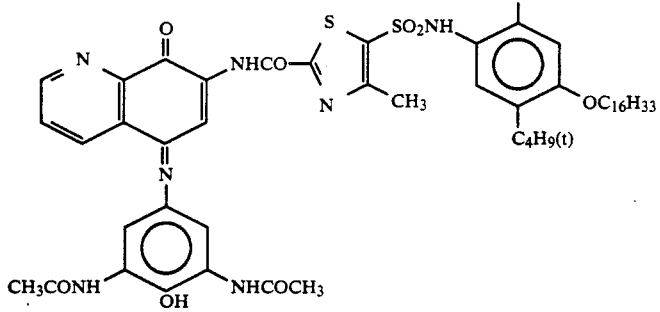

C(29)

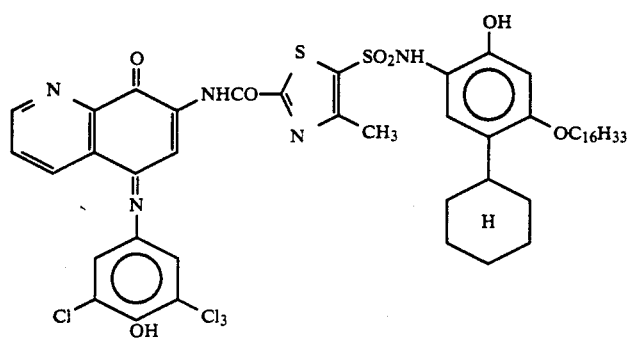

C(30)

The process for the synthesis of the image-forming compound of the present invention will be described hereafter.

The synthesis of the image-forming compound of the present invention depends on the structure of the dye portion and the type of the substrate Y. The synthesis of the image-forming compound of the present invention can be roughly divided into two methods, i.e., a method which comprises condensation of a dye portion containing a chlorosulfonyl group and a substrate Y containing an amino group and a method which comprises a previous step of condensing a coupler as a dye precursor and a substrate Y and a final step of coupling reaction to form a dye skeleton. If Y is an oxidizable substrate, the former method is mostly used. If Y is a reducible substrate, either of the two methods can be used, but the latter method is suitable for the synthesis of various derivatives. Specific synthesis examples will be described hereafter.

SYNTHESIS EXAMPLE 1

Synthesis of Image-forming Compound A(23)

An isooxazolone intermediate (A) was synthesized in accordance with the method described in Japanese Patent Application No. 62-106896.

1.6 g of pyridine was added to a mixture of 13.5 g of the intermediate (A), 5.5 g of 1-hydroxy-5-methanesulfonamide-2-naphthoic acid and 100 ml of dried tetrahydrofuran at room temperature. 6.1 g of dicyclohexylcarbodimide was added to the mixture in lots. The material was then stirred at a temperature of 40° C. over 1 hour and at a temperature of 20° C. over 3 hours. The resulting crystal was then filtered off, and the filtrate was distilled off under reduced pressure. The residue was then purified by column chromatography (silica gel; eluting solution: 1:1 (volume) ethyl acetate-hexane mixture) to obtain 9.2 g of an intermediate (B) in the form of a white crystal.

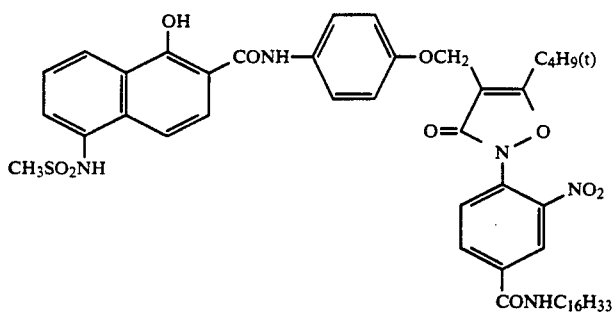

5 ml of triethylamine was added to a mixture of 5.5 g of the intermediate (B), 30 ml of ethyl acetate and 30 ml of triethylamine at room temperature. 1.52 g of 2,6-dichloroquinone-4-chloroimide was then added to the mixture in lots.

The material was then stirred at room temperature over 30 minutes. 100 ml of 1 N hydrochloric acid was added to the material. The material was then extracted with ethyl acetate. The extract was then dried with magnesium sulfate anhydride. The solution was then concentrated under reduced pressure to deposit a black crystal. The crystal was filtered off, and then recrystallized from a mixture of acetonitrile and ethyl acetate to obtain 3.5 g of an image-forming compound A(23) with a melting point of 186° to 189° C. in the form of crystal.

The crystal thus obtained had a maximum absorption at 725 nm in dimethylformamide containing triethylamine.

SYNTHESIS EXAMPLE 2

Synthesis of Image-forming Compound B(22)

Synthesis of Intermediate B(22-a)

Intermediate B(22-a) was synthesized in accordance with the method described in JP-A-60-93434, 60-257579 and 63-40152.

Synthesis of Intermediate B(22-d)

Intermediate B(22-c) (diazonium salt of 2-chloro-4-nitroaniline) was synthesized from Intermediate B(22-b) (2-chloro-4-nitroaniline) in accordance with the following method. An aqueous solution of sodium nitrite (sodium nitrite/water=4.3 g/8 ml) was added dropwise to a suspension of 9.5 g of Intermediate B(22-b) and 80 ml of 36 % hydrochloric acid at a temperature of 5° C. or lower while the latter was stirred. The material was allowed to undergo reaction at a temperature of 5° C. over 3 hours. 1 g of sulfamic acid was added to the reaction system to decompose excess nitrous acid.

The Intermediate B(22-c) diazonium salt thus obtained was then gradually added to a solution of 23.6 g of Intermediate B(22-a) in 120 ml of methanol at a temperature of 5° C. The reaction system was then allowed to undergo reaction at a temperature of 5° C. over 1 hour and at room temperature over 1 hour. The resulting crystal was filtered off, washed with methanol, and thoroughly dried to thereby obtain Intermediate B(22-d) which was then used for the subsequent step. (Yield: 26 g)

Synthesis of Intermediate B(22-e)

26 ml of phosphorus oxychloride was added dropwise to a suspension of 26 g of the Intermediate B(22-d) thus obtained, 13 ml of N,N-dimethylacetamide and 150 ml of acetonitrile while the latter was stirred. The material was allowed to undergo reaction at a room temperature of 60° C. over 2 hours and then allowed to cool to room temperature. The reaction solution was then poured into 1 l of iced water with stirring. The suspension was then stirred at a temperature of 10° C. over 1 hour. The resulting crystal was filtered off, washed with water, and then air-dried to thereby obtain Intermediate B(22-e). (Yield: 22 g)

Synthesis of Compound B(22)

22 g of Intermediate B(22-e) was gradually added to a suspension of 23 g of Intermediate B(22-f), 70 ml of N,N-dimethylacetamide and 8.2 ml of pyridine while the internal temperature was kept at 5° C. or lower. After 1 hour, 137 ml of acetone and 137 ml of methanol were added to the reaction solution. 67 ml of water was then added dropwise to the reaction solution at a temperature of 55° to 60° C. As a result, an oily material was deposited. When the reaction solution was further stirred over 2 hours, the oily material was crystallized. The crystal was filtered off, and then thoroughly washed with methanol. The crystal (Compound B(22)) was purified by flash column chromatography (silica gel; chloroform/methanol=v/v=60/1).

Yield: 29 g (70 %).

Melting point: 133° to 135° C.

$\delta^{DMF}_{max}$: 672.5 nm.

$\epsilon^{DMA}_{max}$: 9.77×10$^4$.

A dimethylformamide solution of Compound B(22) had an absoprtion up to 800 nm.

The steps of the synthesis of compound B(22) are set forth below:

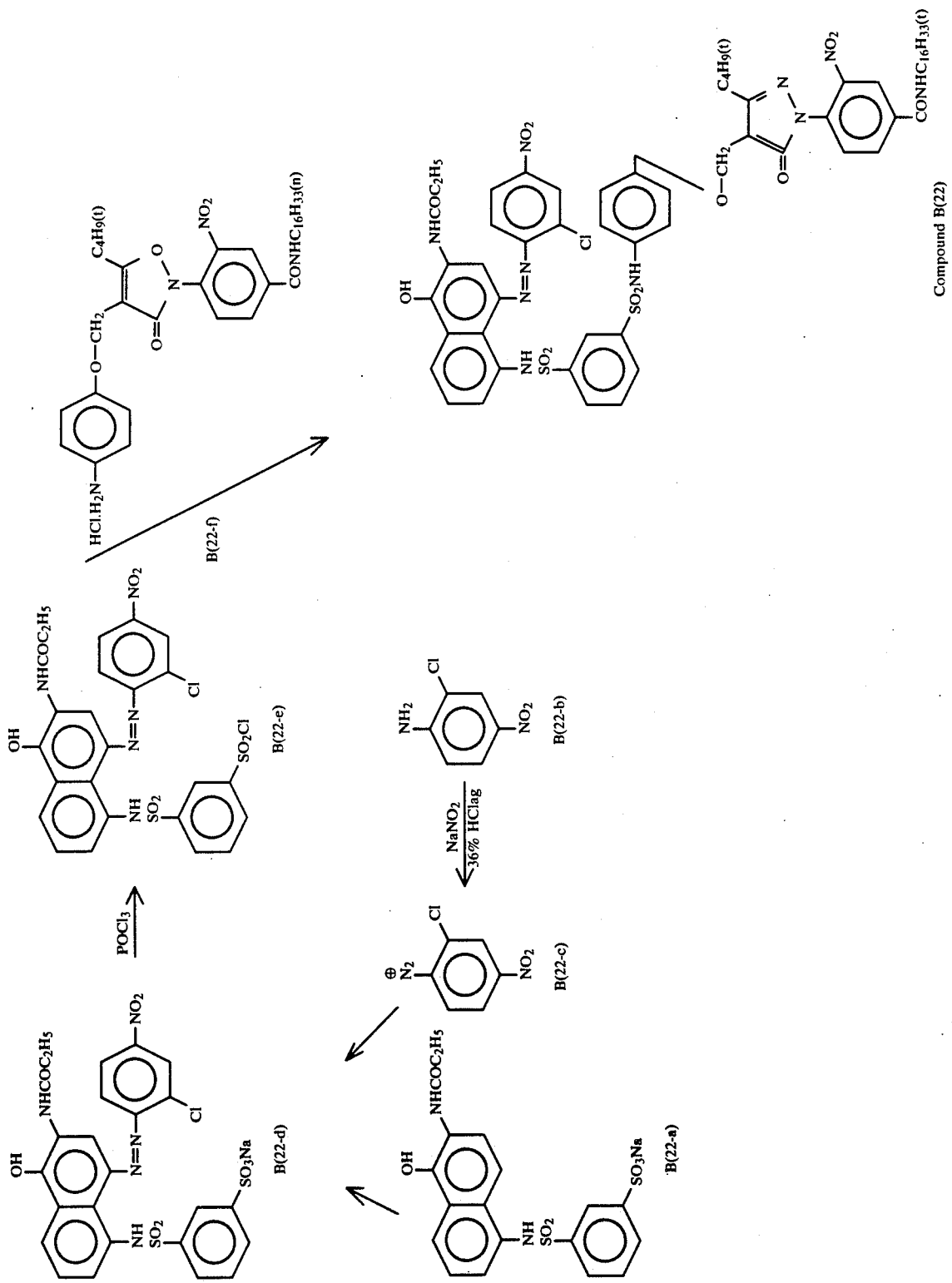

SYNTHESIS EXAMPLE 3

Synthesis of Image-forming Compound B(21)

Compound B(21) was synthesized in substantially the same manner as in Compound B(22) in accordance with the above described synthesis steps, except that Intermediate B(21-b) was used in place of Intermediate B(22-b), to prepare the Intermediate B(21-c) diazonium salt. Intermediate B(21-b) was 2-methoxy-4-nitroaniline. The properties of Compound B(22) are set forth below.

Melting point: 128° to 130° C.
$\delta^{DMF}_{max}$: 689.4 nm.
$\epsilon^{DMF}_{max}$: 6.83 × 10$^4$.

A dimethylformamide solution of Compound B(21) had an absorption up to a wavelength region higher than 800 nm.

The steps of synthesis of Compound B(21) are set forth below:

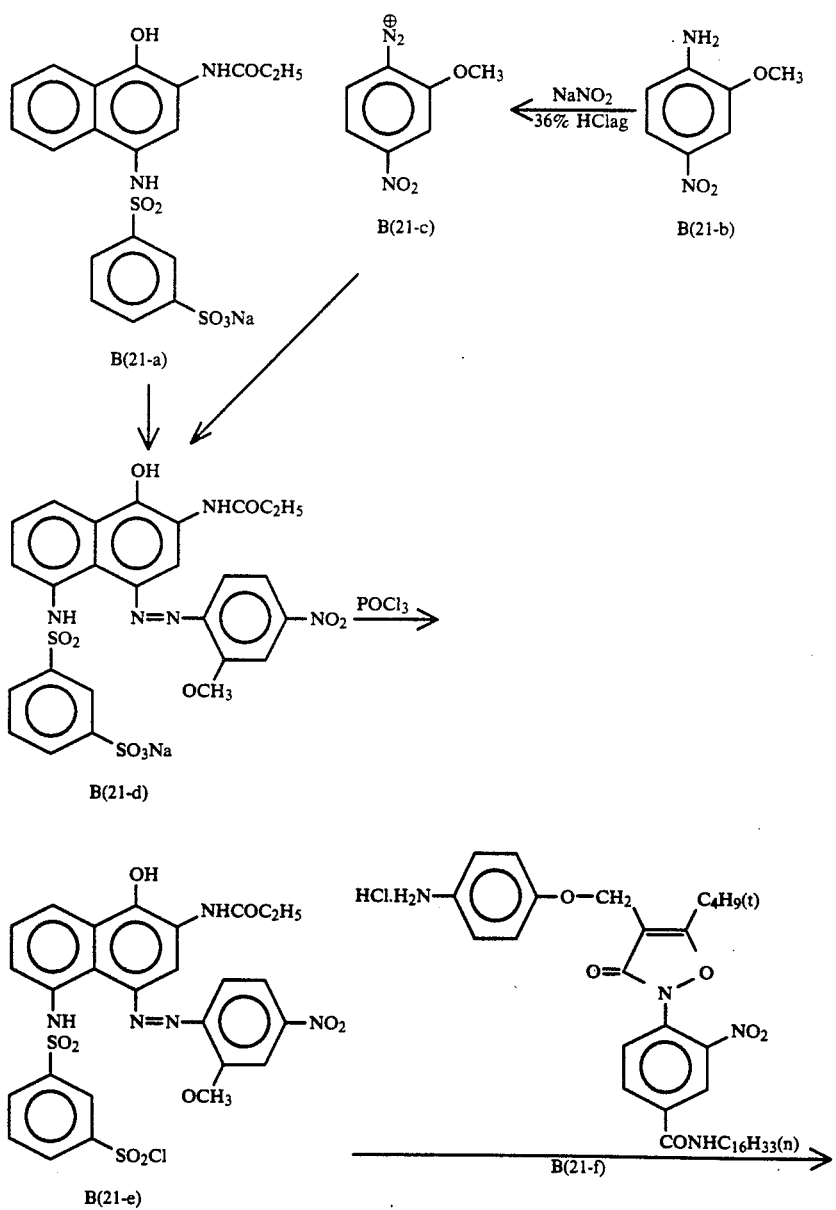

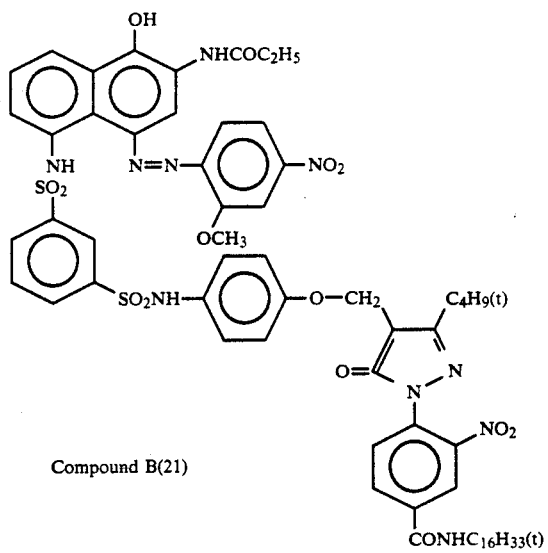

Compound B(21)

SYNTHESIS EXAMPLE 4

Synthesis of Image-forming Compound B(2)

6 34 g of a salt of 2-amino-4-hexadecyloxy-5-t-octylphenol with p-toluenesulfonic acid was dissolved in a mixture of 30 ml of dimethylacetamide and 10 ml of pyridine. 7.15 g of Intermediate B(21-e) obtained in Synthesis Example 3 was added to the material under cooling with ice in lots. The material was then stirred at room temperature over 1 hour. The reaction solution was poured into a cooled dilute hydrochloric acid. The reaction solution was then extracted with ethyl acetate. The extract was washed with water, and then dried with magnesium sulfate anhydride. The solvent was distilled off under reduced pressure. The residue was then purified by column chromatography (eluting solution: n-hexane/ethyl acetate=$\frac{1}{2}$ volume ratio) to obtain 4.6 g of Compound B(2) in the form of an orange brown crystal. (m.p. 157°–162° C.)

SYNTHESIS EXAMPLE 5

Synthesis of Image-forming Compound C(1)

3.6 g of triethylamine was added to a mixture of 10.0 g of 7-(4-methoxy-3-sulfophenylcarboxyamino)-8-quinolinol potassium salt (a):

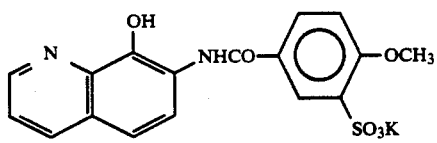

and 100 ml at room temperature. 5.0 g of 2,6-dichloroquinone-4-chloroimide was added to the mixture in lots. The reaction solution was stirred at room temperature over 30 minutes. 100 ml of 1 N hydrochloric acid was added to the reaction solution. The resulting red brown crystal was filtered off, washed with methanol, and then dried to obtain 12.0 g of Intermediate (b).

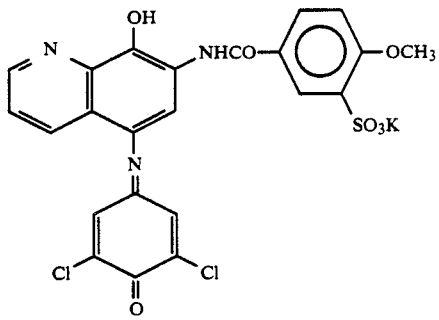

8.6 ml of phosphorous oxychloride was added dropwise to a suspension of 10.0 of Intermediate (b), 3 ml of N,N-dimethylacetamide and 100 ml of acetonitrile with stirring. The mixture was allowed to undergo reaction at a temperature of 60° C. over 2 hours and then cooled with water to room temperature. The reaction solution was poured into 500 ml of iced water. The mixture was then stirred at a temperature of 10° C. or lower over 30 minutes. The resulting crystal was filtered off, washed with water, and then air-dried to obtain 8.7 g of Compound (c):

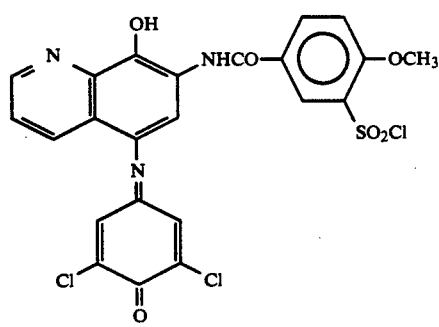

A suspension of 8.8 g of 2-amino-4-hexadecyloxy-5-t-octylphenol-p-toluene sulfonate, 45 ml of N,N-dimethylacetamide and 5.4 ml of α-picric acid was kept at a temperature of 5° C. with stirring in a nitrogen flow. 8.0 g of Intermediate (c) was added to the suspension in lots. The suspension was further stirred at a temperature of 70° C. over 2 hours. 63 ml of acetone and 57 ml of methanol were added to the suspension. 40 ml of water was then added dropwise to the reaction solution at a temperature of 50° to 60° C. When the reaction solution was then cooled with water to room temperature after 1 hour, an oily material was deposited. When the reaction solution was further stirred over 2 hours, the oily material was crystallized. The crystal was filtered off, and then thoroughly washed with 60 ml of methanol. As a result, 7.2 g of Compound C(1) was obtained. Compound C(1) had a melting point of 202° to 204° C. and a maximum absorption at 732 nm in dimethylformamide containing a small amount of triethylamine and nickel acetate.

The infrared-absorbing image-forming compound of the present invention itself has an absorption in a near infrared region. The present infrared-absorbing image-forming compound can also shift its absorption to a longer wavelength region when a proper metallic ion is added thereto to form a complex. As such a metallic ion there may be used any transition metal ion (e.g., $Cu^{2+}$, $Ni^{2+}$, $Zn^{2+}$, $Co^{2+}$, $Cr^{2+}$, $Mn^{2+}$, $Fe^{2+}$).

Such a metallic ion (or salt containing such a metallic ion) can be incorporated in any layer in the light-sensitive element or any position in the image-receiving element described later.

The light-sensitive material of the present invention can comprise a compound represented by formula (I) singly but normally in combination with yellow, magenta and cyan image-forming compounds so that it is used for a system for forming a full-color image. The present image-forming compound can be used in admixture with any yellow, magenta and cyan image-forming compound or separately of these image-forming compounds. These yellow, magenta and cyan image-forming compounds are known and of the same type as the compound of formula (I) except that Dye portion in formula (I) is a yellow, magenta or cyan dye or its precursor.

In general, the short wavelength absorption region of the present infrared-absorbing image-forming compound often overlaps the absorption region of a cyan dye (600 to 700 nm). Therefore, the present infrared-absorbing image-forming compound is advantageously used in combination with a cyan image-forming compound in the light of color reproduction.

The present infrared-absorbing image-forming compound can be incorporated in a light-sensitive material in quite the same manner as other image-forming compounds. In most cases, the substrate Y in formula (I) contains a hydrophobic ballast group which renders the image-forming compound itself nondiffusive. Therefore, in order to incorporate the present image-forming compound in a light-sensitive material, a method is often emplyed which comprises emulsion-dispersion of a solution of the compound in a nonvolatitle oil.

The amount of the present infrared-absorbing image-forming compound to be incorporated depends on the type and purpose of the light-sensitive material or the properties of the compound and is generally from 0.05 to 1.0 g/m², and preferably from 0.05 to 0.3 g/m².

The image-forming compound can be used, singly or in combination with a reducing substance which reduces exposed silver halide to make cross oxidation with the present compound. As such a reducing substance there may be used any type of reducing substance. Preferred examples of such a reducing substance include hydroquinones, 3-pyrazolidones, aminophenols, catechols, p-phenylenediamines, aminonaphthols, and reductones.

Precursors which undergo hydrolysis under an alkaline condition to produce such a reducing compound can be used.

Examples of such precursors are disclosed in JP-A-55-52055 and 57-135949, and JP-B-54-39727.

Specific preferred examples of reducing compounds include 3-pyrazolidones (e.g., 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis-(hydroxymethyl)-3-pyrazolidone, 1,4-di-methyl-3-pyrazolidone, 4-methyl-3-pyrazolidone, 4,4- dimethyl-3-pyrazolidone, 1-(3-chlorophenyl)-4-methyl-3- pyrazolidone, 1-(4-chlorophenyl)-4-methyl-3-pyrazolidone, 1-(4-tolyl)-4-methyl-3-pyrazolidone, 1-(2-tolyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone, 5-methyl-3-pyrazolidone, 1,5-diphenyl-3-pyrazolidone, 1-phenyl-4-methyl-4-stearoyloxymethyl-3-pyrazolidone, 1- phenyl-4-methyl-4-lauroyloxymethyl-3-pyrazolidone, 1-phenyl-4,4-bis-(lauroyloxymethyl)-3-pyrazolidone, 1-phenyl-2-acetyl-3-pyrazolidone, 1-phenyl-3-acetoxypyrazolidone), hydroquinones (e.g., hydroquinone, trihydroquinone, 2,6-dimethylhydroquinone, t-butylhydroquinone, 2,5-di-t-butyl-hydroquinone, t-octylhydroquinone, 2,5-di-t-octylhydroquinone, pentadecylhydroquinone, sodium 5-pentadecylhydroquinone-sulfonate), oxyphenols (e.g., p-benzoyloxyphenol, 2-methyl-4-benzoyloxyphenol, 2-t-butyl-4-(4-chlorobenzoyloxy)-phenol), aminophenols (e.g., 4-amino-2,6-dichlorophenol, 4-amino-2,6-dibromophenol, 4-amino-2-methylphenol sulfate, 4-amino-3-methylphenol sulfate, 4-amino-2,6-dichlorophenol hydrochloride, p-aminophenol, p-methylaminophenol, p-dimethylaminophenol, p-dimethylaminophenol, p-dibutylaminophenol, p-piperidinoaminophenol, 4-dimethylamino-2,6-dimethoxyphenol), phenylenediamines (e.g., N-methyl-p-phenylenediamine, N,N-dimethyl-p-phenylenediamine, N,N-diethyl-p-phenylenediamine, N,N,N',N'-tetramethyl-p-phenylenediamine, 4-diethylamino-2,6-dimethoxyaniline), and reductones (e.g., piperidinohexose reductone, pyrrodinohexose reductone).

Further examples of useful reducing compounds include 2,6-dichloro-4-substituted sulfonamidephenol and 2,6-dibromo-4-substituted sulfonamidephenol as disclosed in Research Disclosure No. 15108, and U.S. Pat. No. 4,021,240, and p-(N,N-dialkylaminophenol)sulfamine as disclosed in JP-A-59-116740. In addition to these phenolic reducing agents, naphtholic reducing agents such as 4-aminonaphthol compounds and 4-substituted sulfonamidenaphthol derivative are useful.

These reducing substances or precursors thereof can be used, singly or in combination of two kinds thereof.

Any silver halide such as silver chloride, silver bromide, silver bromoiodide, silver bromochloride, and silver bromochloroiodide can be used in the present invention. The silver halide grains may have a uniform inner halogen composition or a multiple structure in which the surface layer and the internal layer have different halogen compositions as described in JP-A-57-

154232, 58-108533, 59-48755 and 59-52237, U.S. Pat. No. 4,433,048, and European Patent 100,984. Alternatively, tabular grains having a thickness of 0.5 μm or less, a diameter of at least 0.6 μm and an average aspect ratio of 5 or more (as described in U.S. Pat. Nos. 4,414,310 and 4,435,499, and West German Patent Application (OLS) 3,241,646A1) or monodisperse emulsions (as described in JP-A-57-178235, 58-100846 and 58-14829, International Patent Application 83/02338A1, and European Patent Nos. 64,412A3 and 83,377A1) can be used in the present invention. Two or more kinds of silver halide emulsions having different crystal habits, halogen compositions, grain sizes or grain size distributions can be used in combination. Two or more kinds of monodisperse emulsions having different grain sizes can be used in admixture to adjust gradation.

The average grain diameter of silver halide which can be used in the present invention can be in the range of 0.001 to 10 μm, particularly 0.001 to 5 μm. These silver halide emulsions can be prepared by the acid process, the neutral process, the ammonia process, etc. The reaction of a soluble silver salt and a soluble halide can be carried out by a single jet process, a double jet process, a combination thereof, and the like. A method in which grains are formed in the presence of excess silver ions (so-called reverse mixing method) may be used. Further, a so-called controlled double jet process, in which the pAg value of the liquid phase in which the silver grains are formed is maintained constant, may also be used. In order to expedite the growth of grains, the concentration and amount of silver salt and halide to be incorporated or the rate at which these salts are incorporated may be increased (as described in JP-A-55-142329 and 55-158124, and U.S. Pat. No. 3,650,757).

Silver halide grains of epitaxial junction type can be also used (as described in JP-A-56-16124 and U.S. Pat. No. 4,094,648).

In the step of formation of the silver halide grains which can be used in the present invention, as a silver halide solvent there can be used ammonia, an organic thioether compound as described in JP-B-47-11386 or a sulfur-containing compound as described in JP-A-53-144319.

A cadmium salt, zinc salt, lead salt, thallium salt or the like may be present in the process of grain formation or physical ripening.

Furthermore, in order to improve high intensity reciprocity law failure or low intensity reciprocity law failure, a water-soluble iridium salt such as iridium chloride (III, IV) or ammonium hexachloroiridate or water-soluble rhodium salt such as rhodium chloride may be used.

The soluble salts can be removed from the silver halide emulsion after sedimentation or physical ripening. For this purpose, the noodle rinse process or the sedimentation process can be used.

The silver halide emulsion may be used unripened but is normally subjected to chemical sensitization before used. When applied to ordinary type light-sensitive materials, the silver halide emulsion may be subjected to sulfur sensitization, reduction sensitization, noble metal sensitization, etc., singly or in combination. These chemical sensitization processes may be effected in the presence of a nitrogen-containing heterocyclic compound as described in JP-A-58-26526 and 58-215644.

The silver halide emulsion which can be used in the present invention may be either of the surface latent image type in which the latent images are formed mainly on the surface thereof or internal latent image type in which latent images are formed mainly in the internal portion thereof. A direct reversal emulsion which is a combination of an internal latent image type emulsion, a nucleating agent and/or light fogging can be used. Examples of internal latent type emulsions suitable for this purpose are described in U.S. Pat. Nos. 2,592,250 and 3,761,276, JP-B-58-3534, and JP-A-57-136641. Examples of nucleating agents which can be used in combination with the emulsion are described in U.S. Pat. Nos. 3,227,552, 4,245,037, 4,255,511, 4,266,031, and 4,276,364, and OLS 2,635,316. The light fogging can be accomplished by any suitable known method as described in JP-B-45-12710 and JP-A-61-159641.

The silver halide which can be used in the present invention may be spectrally sensitized with a methine dye or the like.

Examples of such a spectral sensitizing dye which can be used include cyanine dye, merocyanine dye, holopolar cyanine dye, hemicyanine dye, styryl dye and hemioxonol dye. Particularly useful dyes are those belonging to cyanine dye, merocyanine dye and composite merocyanine dye. To these dyes may be applied as basic heterocyclic nucleus commonly used in cyanine dyes. Examples of such nucleus include pyrroline nucleus, oxazoline nucleus, thiazoline nucleus, pyrrole nucleus, oxazole nucleus, thiazole nucleus, selenazole nucleus, imidazole nucleus, tetrazole nucleus, nucleus comprising aliphatic hydrocarbon rings fused these nucleus, and nucleus comprising aromatic hydrocarbon rings fused these nucleus (e.g., indolenine nucleus, benzindolenine nucleus, indole nucleus, benzoxadole nucleus, naphthoxadole nucleus, benzothiazole nucleus, naphthothiazole nucleus, benzoselenazole nucleus, benzimidazole nucleus, quinoline nucleus). These nucleus may substitute for atoms on carbon atom.

To merocyanine dyes or composite melocyanine dyes may be applied 5- or 6-membered heterocyclic nucleus such as pyrazoline-5-on nucleus, thiohydantoin nucleus, 2-thiooxazolidine-2,4-dion nucleus, thiazolidine-2,4-dion nucleus, rhodanine nucleus and thiobarbituric acid nucleus.

These sensitizing dyes may be used, singly or in combination. Such a combination of sensitizing dyes is often used particularly for the purpose of supersensitization.

The silver halide emulsion may contain a dye which doesn't exhibit a spectral sensitizing effect itself or a compound which doesn't substantially absorb visible light but exhibits a supersensitizing effect. Examples of such a dye or compound include aminostyryl compound substituted by nitrogen-containing heterocyclic groups as described in U.S. Pat. Nos. 2,933,390 and 3,635,721, aromatic organic acid-formaldehyde condensate as described in U.S. Pat. No. 3,743,510, cadmium salt, and azaindene compound. Combinations of sensitizing dyes as described in U.S. Pat. Nos. 3,615,613, 3,615,641, 3,617,295, and 3,635,721 are particularly advantageous.

As a binder or protective colloid which can be used in the emulsion layer or intermediate layer in the light-sensitive material there can be advantageously used gelatin as a protective colloid. Other hydrophilic colloids can be used singly or in combination with gelatin.

In the present invention, either lime-treated gelatin or acid-treated gelatin can be used. The preparation of gelatin is further described in *The Macromolecular*

*Chemistry of Gelatin*, written by Arther Vice, Academic Press, 1964.

The photographic emulsion which can be used in the present invention can comprise a surface active agent or a mixture of surface active agents.

These surface active agents are used as coating aids and can also be used for other purposes, e.g., facilitating emulsion dispersion, supersensitization, improvement of photographic properties, antistatic effect and inhibition of adhesion. These surface active agents can be divided into five groups, i.e., natural surface active agents such as saponin, nonionic surface active agents such as alkylene oxide, glycerin and glycidol, cationic surface active agents such as higher alkylamines, quaternary ammonium salts, pyridine, other heterocyclics, phosphoniums and sulfoniums, anionic surface active agents such as carboxylic acid, sulfonic acid, phosphoric acid, ester sulfate, ester phosphate, and amphoteric surface active agent such as amino acids, aminosulfonic acids and sulfuric or phosphoric esters of amino alcohol.

The photographic emulsion which can be used in the present invention can comprise various compounds for the purpose of inhibiting fogging during the preparation, preservation or photographic processing of the light-sensitive material or for stabilizing the photographic properties of the light-sensitive material. In particular, many compounds known as fog inhibitors or stabilizers can be used. Examples of these compounds include azoles (e.g., benzothiazolium salt, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles (particularly 1-phenyl-5-mercaptotetrazole)), mercaptopyrimidines, mercaptotriazines, thioketo compounds (e.g., oxazolinethion), azaindenes (e.g., triazaindenes, tetraazaindenes (particularly 4-hydroxy-substituted (1,3,3a,7-tetraazaindenes)), pentaazaindenes, benzenesulfonic acids, benzenesulfinic acids, and amide benzenesulfonate.

The photographic emulsion layer in the present photographic light-sensitive material can contain thioether compounds, thiomorpholines, quaternary ammonium salt compounds, urethane compounds, urea compounds, imidazole compounds, 3-pyrazolidones or the like for the purpose of improving sensitivity or contrast or accelerating development.

The photographic light-sensitive material which can be used in the present invention can comprise in the photographic emulsion layer or other hydrophilic colloidal layers a dispersion of a water-insoluble or difficultly-soluble synthetic polymer for the purpose of improving the dimensional stability or like purposes. For example, a polymer comprising as a monomer component alkyl(meth)acrylate, alkoxyalkyl(meth)acrylate, glycidyl(meth)acrylate, (meth)acrylamide, vinylester (e.g., vinyl acetate), acrylonitrile, olefin, styrene or the like, singly or in combination, or combinations thereof with acrylic acid, methacrylic acid, $\alpha,\beta$-unsaturated dicarboxylic acid, hydroxyalkyl(meth)acrylate, styrenesulfonic acid or the like can be used.

The silver halide photographic material which can be used in the present invention can contain other various additives such as a film hardener, brightening agent, dye, desensitizer, coating aid, antistatic agent, plasticizer, lubricant, matt agent, development accelerator, mordant, ultraviolet absorber, discoloration inhibitor or color fog inhibitor.

Specific examples of these additives which can be used in the present invention are described in Research Disclosure No. 176, pp 22–31 (RD-17643) (1978).

The color light-sensitive material of the present invention can be applied to any of transfer type color light-sensitive materials, and preferably applied to a heat-developable light-sensitive material and an instant color photographic material.

The compound of formula (I) which can release a diffusive dye is preferably used in heat-developable light-sensitive materials comprising a silver halide which undergoes heat development to form a mobile dye which is then moved to a dye-fixing layer as described in JP-A-58-149046, 59-154445, 59-165054, 59-180548, 59-218443, 60-133449, and 61-238056, and U.S. Pat. Nos. 4,503,137, 4,474,867, 4,483,914, 4,455,363, 4,500,626, and 61-238056. Such heat-developable light-sensitive materials will be often referred to as "light-sensitive elements".

When the compound of formula (I) is applied to a light-sensitive element, an organic metal salt can be used as an oxidizing agent in combination with a light-sensitive silver halide. Particularly useful organic metal salts are organic silver salts.

Examples of organic compounds which can be used to form the above described organic silver salt oxidizing agent include benzotriazoles, aliphatic acid and other compounds as described in U.S. Pat. No. 4,500,626 (52nd to 53rd column). Silver salts of carboxylic acids containing alkynyl groups such as silver phenylpropiolate as described in JP-A-60-113235 and acetylene silver as described in JP-A-61-249044 are also useful. Two or more such organic silver salts can be used in combination.

The amount of such an organic silver salt to be used is normally from 0.01 to 10 mol, preferably 0.01 to 1 mol per 1 mol of light-sensitive silver halide. The total coated amount of the light-sensitive silver halide and the organic silver salt is preferably from 50 mg to 10 g/m$^2$ as calculated in terms of amount of silver.

In the present invention, various fog inhibitors or photographic stabilizers can be used. Examples of fog inhibitors or photographic stabilizers which can be used in the present invention include azoles and azaindenes as described in RD17643 (1978)(pp 24–25), nitrogen-containing carboxylic acids and phosphoric acids as described in JP-A-59-168442, mercapto compounds and metallic salts thereof as described in JP-A-59-111636, and acetylene compounds as described in JP-A-62-87957.

The constituting layers of the light-sensitive element or dye-fixing element preferably comprises a hydrophilic binder. Examples of such a hydrophilic binder are described in JP-A-62-253159 (pp 26–28). In particular, transparent or semitransparent hydrophilic binders can be preferably used. Examples of these binders include protein or cellulose compounds such as gelatin or gelatin compounds, natural compounds such as polysaccharide (e.g., starch, gum arabic, dextran, pullulan), polyvinyl alcohol, polyvinyl pyrrolidone, acrylamide polymer, and other synthetic high molecular compounds. Other examples of these binders include highly water-absorbing polymers as described in JP-A-62-245260, i.e., a homopolymer of a vinyl monomer containing —COOM or —SO$_3$M (in which M represents a hydrogen atom or alkaline metal) or a copolymer of these vinyl monomers or a copolymer of these vinyl monomers with other vinyl monomers (e.g., sodium methacrylate, ammonium methacrylate, Sumicagel L-5H produced by Sumitomo Chemical Co., Ltd.). Two or more such binders can be used in combination.

In a system wherein heat development is effected with the supply of a slight amount of water, the above described highly water-absorbing polymer can be used to expedite the absorption of water. When such a highly water-absorbing polymer is incorporated in the dye-fixing layer or its protective layer, a dye which has been transferred to the dye-fixing element can be prevented from being retransferred to other elements.

In the present invention, the coated amount of the binder is preferably from 20 g or less, particularly 10 or less, more particularly 7 g or less per 1 $m^2$.

The constituting layers of the light-sensitive element or dye-fixing element (including backing layer) can comprise various polymer latexes for the purpose of stabilizing dimension, inhibiting curling, adhesion or film cracking or improving film properties of pressure-sensitization or desensitization inhibiting layer. Specific examples of such polymer latexes which can be used in the present invention include those described in JP-A-62-245258, 62-136648 and 62-110066. In particular, if a polymer latex having as low a glass transition point as 40° C. or lower is incorporated in a mordant layer, the mordant layer can be protected against cracking. If a polymer latex having a high glass transition point is incorporated in a backing layer, an anticurling effect can be obtained.

As a reducing agent which can be used in the present invention there can be used any suitable reducing agent known in the field of heat-developable light-sensitive material. As such a reducing agent there can also be used a reducing image-forming substance (dye-donating compound) (In this case, other reducing agents can be used in combination therewith). Furthermore, a reducer precursor which has no reducing effect itself but exhibits a reducing effect when acted on by a nucleopholic reagent or heat during development can be used as a reducing agent.

Other examples of reducing agents which can be used in the present invention include reducers and reducer precursors as described in U.S. Pat. Nos. 4,500,626 (49th–50th columns), 4,483,914 (30th–31st columns), 4,330,617, and 4,590,152, JP-A-60-140335 (pp 17–18), 47-40245, 56-138736, 59-178458, 59-53831, 59-182449, 59-182450, 60-119555, 60-128436, 60-128439, 60-198540, 60-181742, 61-259253, 62-244044, 62-131253, and 62-131256, and European Patent No. 220,746A2 (pp 78–96).

A combination of various reducing agents as disclosed in U.S. Pat. No. 3,039,869 can be also used.

If a nondiffusive reducing agent is used, an electron transfer agent and/or an electron transfer agent precursor can be optionally used in combination therewith in order to accelerate the transfer of electrons between the nondiffusive reducing agent and the developable silver halide.

Such an electron transfer agent or its precursor can be selected from the above described reducing agents or precursors thereof. The electron transfer agent or its precursor preferably has a greater mobility than the nondiffusive reducing agent (electron donor). Particularly useful electron transfer agents are 1-phenyl-3-pyrazolidones or aminophenols.

As the nondiffusive reducing agent (electron donor) to be used in combination with the electron transfer agent there can be used the above described reducing agent which does not substantially move in the layer of the light-sensitive element. Preferred examples of such a reducing agent include hydroquinones, sulfonamidephenols, sulfonamidenaphthols and compounds described as electron donors in JP-A-53-110827.

In the present invention, the amount of the reducing agent which can be incorporated can be from 0.001 to 20 mol, particularly 0.01 to 10 mol per 1 mol of silver.

In the present invention, the light-sensitive element can contain a compound which can both activate development and stabilize images. Specific preferred examples of such a compound are described in U.S. Pat. No. 4,500,626 (pp 51–52).

In a system wherein the diffusion transfer of dyes is effected to form images, a dye-fixing element is used in combination with the light-sensitive element. The dye-fixing element and the light-sensitive element can be separately coated on separate supports or coated on the same support. For the relationship between the light-sensitive element and the dye-fixing element, between the light-sensitive element and the support and between the light-sensitive element and the white reflective layer, those described in U.S. Pat. No. 4,500,626 can be applied to the present invention.

The dye-fixing element which can be preferably used in the present invention comprises at least one layer containing a mordant and a binder. As such a mordant there can be used any mordant known in the art. Specific examples of such a mordant include those described in U.S. Pat. No. 4,500,626 (58th–59th columns), and JP-A-61-88256 (pp 32–41), 62-244043, and 62-244036. Dye-accepting high molecular compounds as described in U.S. Pat. No. 4,463,079 can be also used in the present invention.

The dye-fixing element can optionally be provided with auxiliary layers such as a protective layer, release layer or anticurling layer. Particularly, a protective layer is useful.

The constituting layers of the light-sensitive element and dye-fixing element can contain a plasticizer, a lubricant or a high boiling organic solvent as an agent for improving release of the light-sensitive element from the dye-fixing element. Specific examples of these additives are described in JP-A-62-253159 (p 25) and 62-245253.

For the above described purposes, various silicone oils (ranging from dimethyl silicone oil to modified silicone oil comprising organic groups incorporated in dimethyl siloxane) can be used. Examples of such silicone oils include various modified silicone oils described in *Hensei Silicone Oil* (Modified Silicone Oil) (technical data published by Shin-Etsu Silicone Co., Ltd.; pp 6–18B). Particularly useful among these modified silicone oils is carboxy-modified silicone (trade name: X-22-3710 made by Shin-Etsu Silicone Co., Ltd.).

Further useful examples of silicone oils include silicone oils as described in JP-A-62-215953 and 63-46499.

The light-sensitive element or dye-fixing element can contain a discoloration inhibitor. Examples of such a discoloration inhibitor include oxidation inhibitors, ultraviolet absorbers and certain kinds of metal complexes.

Examples of the oxidation inhibitors include chroman compounds, coumaran compounds, phenolic compounds (e.g., hindered phenols), hydroquinone compounds, hindered amine compounds and spiroindan compounds. Compounds as described in JP-A-61-159644 are also useful.

Examples of the ultraviolet absorbers include benzotriazole compounds as described in U.S. Pat. No. 3,533,794, 4-thiazolidone compounds as described in U.S. Pat. No. 3,352,681, benzophenone compounds as described in JP-A-46-2784, and compounds as described in JP-A-54-48535, 62-136641, and 61-88256. Ultraviolet-absorbing polymers as described in JP-A-62-260152 are also be useful.

Examples of the metal complexes include compounds as described in U.S. Pat. Nos. 4,241,155, 4,245,018 (3rd–36th columns), and 4,254,196 (3rd to 8th columns), JP-A-62-174741, 61-88256 (pp 27–29) and 1-75568.

Useful examples of discoloration inhibitors are described in JP-A-62-215272 (pp 125–137).

The discoloration inhibitor for inhibiting discoloration of a dye which has been transferred to the dye-fixing element can be previously incorporated in the dye-fixing element or can be supplied to the dye-fixing element externally, e.g., from the light-sensitive element.

The above described oxidation inhibitors, ultraviolet absorbers and metal complexes can be used in combination.

The light-sensitive element or dye-fixing element can contain a fluorescent brightening agent. In particular, the fluorescent brightening agent is preferably incorporated in the dye-fixing element or supplied thereto externally, e.g., from the light-sensitive element. Examples of such a fluorescent brightening agent include compounds as described in K. Venkataraman, "The Chemistry of Synthetic Dyes", Vol. V, Chapter 8, and JP-A-61-143752. Specific examples of these fluorescent brightening agents include stilbene compounds, coumarin compounds, biphenyl compounds, benzooxazolyl compounds, naphthalimide compounds, pyrazoline compounds, and carbostyryl compounds.

The flourescent brightening agent can be used in combination with the discoloration inhibitor.

Examples of a film hardener which can be incorporated in the constituting layers of the light-sensitive element or dye-fixing element include those described in U.S. Pat. No. 4,678,739 (41th column), and JP-A-59-116655, 62-245261, and 61-18942. Specific examples of these film hardeners include aldehyde film hardeners (e.g., formaldehyde), azilidine film hardeners, epoxy film hardeners (e.g.,

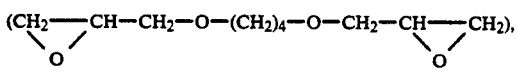

vinylsulfone film hardeners (e.g., N,N'-ethylene-bis(-vinylsulfonylacetamide)ethane), N-methylol film hardeners, and high molecular weight film hardeners (e.g., compounds as described in JP-A-62-234157).

The consituting layers of the light-sensitive element or dye-fixing element can contain various surface active agents for the purpose of facilitating coating, improving releasability and smoothness, inhibiting charging or accelerating development. Specific examples of such surface active agents are described in JP-A-62-173463 and 62-183457.

The constituting layers of the light-sensitive element or dye-fixing element can contain an organic fluoro compound for the purpose of improving smoothness and releasability or inhibiting charging. Typical examples of such an organic fluoro compound include fluorine surface active agents as described in JP-B-57-9053 (8th to 17th columns), and JP-A-61-20944 and 62-135826, and hydrophobic fluorine compounds such as oily fluorine compounds (e.g., fluorine oil) or solid fluorine compound resin (e.g., tetrafluoroethylene resin).

The light-sensitive element or dye-fixing element can contain a matt agent. Examples of such a matt agent include compounds as described in JP-A-61-88256 (p. 29), e.g., silicon dioxide, polyolefin or polymethacrylate. Further examples of such a matt agent include compounds as described in JP-A-63-274944 and 63-274952, e.g., benzoguanamine resin beads, polycarbonate resin beads or AS (acrylonitrile-styrene) resin beads.

In addition, the constituting layers of the light-sensitive element and dye-fixing element can comprise a heat solvent, an antifoaming agent, a sterilizer, an anti-molding agent, colloidal silica or the like. Specific examples of these additives are described in JP-A-61-88256 (pp. 26–32).

In the present invention, the light-sensitive element and/or the dye-fixing element can comprise an image formation accelerator. The image formation accelerator serves to accelerate a redox reaction of a silver salt oxidizing agent and a reducing agent, production or decomposition of a dye or release of a diffusive dye from a dye-donating substance and transfer of a dye from a light-sensitive material layer to a dye-fixing layer. From the physicochemical standpoint of view, the image formation accelerator can be classified as base or base precursor, a nucleophilic compound, a high boiling organic solvent (oil), a heat solvent, a surface active agent and a compound which interacts with silver or silver ion. These groups normally have composite functions and hence can provide a combination of some of the above described accelerating effects. This is further described in U.S. Pat. No. 4,678,739 (pp 38–40).

Examples of such base precursors include salts of bases with organic acids which undergo decarboxylation on heating, and compounds which undergo intramolecular nucleophilic substitution reaction, Lossen rearragement or Beckman rearrangement to release amines. Specific examples of these base precursors are described in U.S. Pat. No. 4,511,493, and JP-A-62-65038.

In a system wherein heat development and dye transfer are simultaneously effected in the presence of a small amount of water, the base and/or base precursor is preferably incorporated in the dye-fixing element in order to improve the preservability of the light-sensitive element.

A combination of a difficultly-soluble metallic compound and a compound capable of complexing metal ions constituting the difficultly-soluble metallic compound (referred to as "complexing compound") as described in European Patent Disclosure No. 210,660 and a compound which undergoes electrolysis to produce a base as described in JP-A-61-232451 can be also used as a base precursor. Particularly, the former base precursor is effectively used. The difficultly-soluble metallic compound and the complexing compound are preferably incorporated separately in the light-sensitive element and the dye-fixing element, respectively.

The present light-sensitive element and/or dye-fixing element can contain any suitable development stop agent for the purpose of providing constant images against a fluctuation in the development temperature and time.

The term "development stop agent" as used herein means a compound which readily neutralizes a base or reacts with a base after a proper development to decrease the base concentration in the film, thereby stopping development or a compound which interacts with silver or a silver salt to inhibit development. Specific examples of such a development stop agent include acid precursors which release an acid on heating, electrophilic compounds which undergo a substitution reaction with a base present therewith on heating, nitrogen-containing heterocyclic compounds, mercapto compounds and precursors thereof. These development stop agents are further described in JP-A-62-253159 (pp 31–32).

As the support for the light-sensitive element and dye-fixing element there can be used a material which can withstand the processing temperature. In general, paper, synthetic high molecular compounds (film), etc. are used. Specific examples of these materials include polyethyleneterephthalate, polycarbonate, polyvinyl chloride, polystyrene, polypropylene, polyimide, cellulose (e.g., triacetyl cellulose), materials comprising a pigment such as titanium oxide incorporated into these films, synthetic paper prepared from polypropylene, etc. by film process, mixed paper prepapred from a synthetic resin pulp such as polyethylene and a natural pulp, yankee paper, baryta paper, coated paper (particularly castcoated paper), metal, cloth, and glass.

These materials can be used, singly or in the form of a lamination with a synthetic high molecular weight compound such as polyethylene (one side or both sides).

In addition, support materials as described in JP-A-62-253159 (pp 29–31) can be used in the present invention.

The surface of these supports can be coated with a hydrophilic binder and an antistatic agent such as a metal oxide semiconductor (e.g., alumina sol, tin oxide) or carbon black.

In order to imagewise expose a light-sensitive element, various methods can be used. For example, a camera can be used to directly photograph scenery or persons. In another process, the light-sensitive element is exposed to light through a reversal film or negative film by means of a printer or enlarger. In a process using an exposure apparatus in a copying machine, the light-sensitive element is exposed to light reflected from an original through a slit in a scanning manner. In another process, the light-sensitive material is exposed to light from a light-emitting diode or a laser diode which has received an electrical signal representative of image data. Alternatively, the light-sensitive element can be exposed directly or through an optical system to light from an image display apparatus such as CRT (cathode-ray tube), liquid crystal display, electroluminescence display or plasma display which has received image data.

Examples of light sources to which the light-sensitive element can be exposed to record images thereon include natural light, tungsten lamp, light-emitting diode, laser light source, CRT and other light sources as described in U.S. Pat. No. 4,500,626 (56th column).

Examples of the above described image data which can be utilized in the present invention include an image signal obtained from a video camera, electrical steal camera, etc., a television signal according to Japanese Television Signal Regulation (NTSC), an image signal obtained by dividing an original into a large number of picture elements by a scanner or the like, and an image signal obtained by a computer such as CG (computer graphics) or CAD (computer-aided drawings).

The present color light-sensitive material may be designed to be processed in a so-called ordinary wet color diffusion transfer process. In this case, the above described light-sensitive material and dye-fixing material can be used without the necessity of additives inherent to heat development (e.g., organic silver salt). The base or electron transfer agent can be supplied from a processing solution contained in a rupturable container. This processing solution can contain a viscosity increaser as well known in the art. The color diffusion transfer process is well known in the art, and the present invention can be applied to any known means in the art.

In accordance with the present invention, the image-forming compound represented by the general formula (I) can provide a color light-sensitive material which provide color images that can be read by an infrared light reading apparatus.

The present invention will be further described in the following examples, but the present invention is not construed as being limited thereto.

EXAMPLE 1

The preparation of an emulsion for the 1st layer will be described hereafter.

600 ml of an aqueous solution containing sodium chloride and potassium bromide and an aqueous solution of silver nitrate obtained by dissolving 0.59 mol of silver nitrate in 600 ml of water were simultaneously added to an aqueous solution of gelatin (obtained by dissolving 20 g of gelatin and 3 g of sodium chloride in 1,000 ml of water and kept at a temperature of 75° C.) at the same flow rate with vigorous stirring in 40 minutes. Thus, a monodisperse emulsion of cubic silver bromochloride grains having an average grain size of 0.35 $\mu$m (bromine content: 80 mol %) was prepared.

After being washed with water and then desalted, the emulsion was subjected to chemical sensitization with 5 mg of sodium thiosulfate and 20 mg of 4-hydroxy-6-methyl-1,3,3a,7-tetrazaindene at a temperature of 60° C. The yield of the desired emulsion was 600 g.

The preparation of an emulsion for the 3rd layer will be described hereafter.

600 ml of an aqueous solution containing sodium chloride and potassium bromide, an aqueous solution of silver nitrate obtained by dissolving 0.59 mol of silver nitrate in 600 ml of water and the following dye solution (I) were simultaneously added to an aqueous solution of gelatin (obtained by dissolving 20 g of gelatin and 3 g of sodium chloride in 1,000 ml of water and kept at a temperature of 75° C.) at the same flow rate with vigorous stirring in 40 minutes. Thus, a monodisperse emulsion of cubic silver bromochloride grains comprising a dye adsorbed thereon and having an average grain size of 0.35 $\mu$m (bromine content: 80 mol %) was prepared.

After being washed with water and then desalted, the emulsion was subjected to chemical sensitization with 5 mg of sodium thiosulfate and 20 mg of 4-hydroxy-6-methyl-1,3,3a,7-tetrazaindene at a temperature of 60° C. The yield of the desired emulsion was 600 g.

Dye Solution (I)

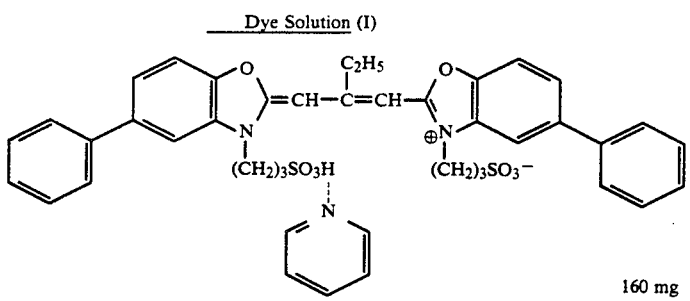

160 mg

Metanol 400 ml

The preparation of a silver halide emulsion for the 5th layer will be described hereafter.

1,000 ml of an aqueous solution containing potassium iodide and potassium bromide and an aqueous solution of silver nitrate obtained by dissolving 1 mol of silver nitrate in 1,000 ml of water were simultaneously added to an aqueous solution of gelatin (obtained by dissolving 20 g of gelatin and 20 g of ammonia in 1,000 ml of water and kept at a temperature of 50° C.) with vigorous stirring while the pAg thereof was kept constant. Thus, a monodisperse emulsion of octahedron silver bromoiodide grains having an average grain size of 0.5 μm (bromine content: 5 mol %) was prepared.

After being washed with water and then desalted, the emulsion was subjected to gold and sulfur sensitization with 5 mg of chloroauric acid (tetrahydrate) and 2 mg of sodium thiosulfate at a temperature of 60° C. The yield of the desired emulsion was 1.0 kg.

The preparation of an organic silver salt will be described hereafter.

Organic Silver Salt (1)

The preparation of a benzotriazole silver emulsion will be described hereafter.

28 g of gelatin and 13.2 g of benzotriazole were dissolved in 300 ml of water. The solution thus obtained was stirred at a temperature of 40° C. A solution obtained by dissolving 17 g of silver nitrate in 100 ml of water was added to the solution in 2 minutes.

The pH value of the benzotriazole silver emulsion thus obtained was properly adjusted to cause sedimentation of excess salts which were then removed. Thereafter, the pH value of the emulsion was adjusted to 6.30 to obtain 400 g of the desired benzotriazole silver emulsion.

Organic Silver Salt (2)

20 g of gelatin and 5.9 g of 4-acetylaminophenolpropiolic acid were dissolved in 1,000 ml of 0.1% aqueous solution of sodium hydroxide and 200 ml of ethanol.

The solution thus obtained was stirred at a temperature of 40° C.

A solution obtained by dissolving 4.5 g of silver nitrate in 200 ml of water was added to the solution in 5 minutes.

The pH value of the dispersion thus obtained was properly adjusted to cause sedimentation of excess salts which were then removed. Thereafter, the pH value of the emulsion was adjusted to 6.30 to obtain 300 g of a dispersion of an organic silver emulsion (2).

The preparation of a gelatin dispersion of an image-forming compound will be described hereafter.

4 g of an image-forming Compound A(7), B(2) or C(5), 4 g of the following cyan image-forming compound, 0.2 g of a fog inhibitor having the following structure and 3.5 g of triisononyl phosphate were measured out. These materials were then dissolved in 40 ml of ethyl acetate at a temperature of about 60° C. to obtain a uniform solution. The solution was then mixed with 0.5 g of sodium dodecylbenzenesulfonate and 100 g of a 10% solution of lime-treated gelatin with stirring. The mixture was subjected to dispersion at 10,000 rpm in a homogenizer over 10 minutes. This dispersion was later used as a dispersion of a cyan image-forming compound. A dispersion of the following yellow image-forming compound and a dispersion of the following magenta image-forming compound were then prepared in a similar manner.

Fog Inhibitor

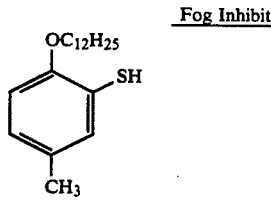

Color light-sensitive materials 101, 102 and 103 having the multilayer structure shown in Table 1 were then prepared from these materials. A color light-sensitive material 104 was prepared as a comparative specimen in the same manner except that the present image-forming compounds were excluded.

Yellow Image-forming Compound

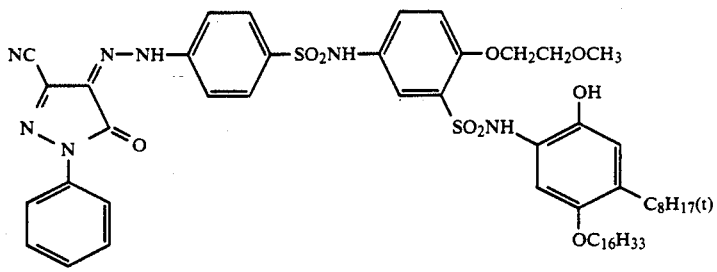

Magenta Image-forming Compound

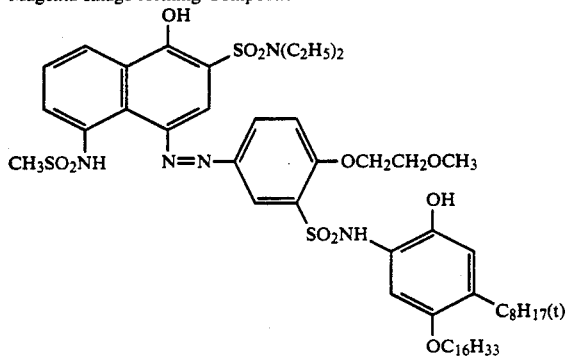

Cyan Image-forming Compound (C-1)

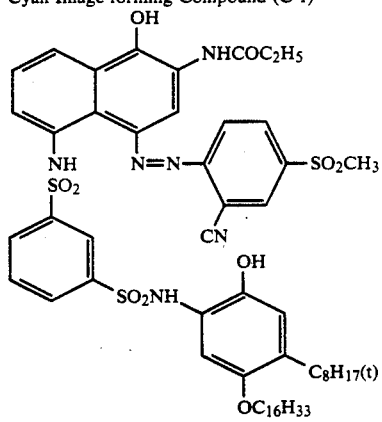

TABLE 1

6th layer
Gelatin (coated amount: 800 mg/m$^2$)
Film hardener*6 (coated amount: 100 mg/m$^2$)
Silica*5 (coated amount: 100 mg/m$^2$)
Zinc hydroxide*7 (coated amount: 300 mg/m$^2$)
5th layer (Blue-sensitive emulsion layer)
Silver bromoiodide emulsion (iodine: 5 mol %; coated amount: 400 mg silver/m$^2$)
Dimethylsulfamide (coated amount: 180 mg/m$^2$)
Organic silver salt(2) (coated amount: 100 mg silver/m$^2$)
Yellow image-forming compound (coated amount: 400 mg/m$^2$)
Gelatin (coated amount: 1,000 mg/m$^2$)
High boiling solvent*4 (coated amount: 200 mg/m$^2$)
Surface active amount: 100 mg/m$^2$
Fog inhibitor (coated amount: 16 mg/m$^2$)
4th layer (Intermediate layer)
Gelatin (coated amount: 1,000 mg/m$^2$)
Zinc hydroxide*7 (coated amount: 300 mg/m$^2$)
3rd layer (Green-sensitive emulsion layer)
Silver bromochloride emulsion (bromine: 80 mol %; coated amount: 300 mg silver/m$^2$)
Dimethyl sulfamide (coated amount: 180 mg/m$^2$)
Organic silver salt(2) (coated amount: 100 mg silver/m$^2$)
Magenta image-forming compound (1) (coated amount: 400 mg/m$^2$)

TABLE 1-continued

Gelatin (coated amount: 1,000 mg silver/m$^2$)
High boiling solvent*4 (coated amount: 200 mg/m$^2$)
Surface active agent*2 (coated amount: 100 mg/m$^2$)
Fog inhibitor (coated amount: 16 mg/m$^2$)
2nd layer (Intermediate layer)
Gelatin (coated amount: 800 mg/m$^2$)
Zinc hydroxide*7 (coated amount: 300 mg/m$^2$)
1st layer (Red-sensitive emulsion layer)
Silver bromochloride emulsion (bromine: 80 mol %; coated amount: 300 mg silver/m$^2$)
Benzenesulfonamide (coated amount: 180 mg/m$^2$)
Organic silver salt (1) (coated amount: 150 mg silver/m$^2$)
Sensitizing dye*3 (coated amount: 10$^{-6}$ mol/m$^2$)
Present infrared image-forming compound (coated amount: 300 mg/m$^2$)
Cyan image-forming compound (coated amount: 300 mg/m$^2$)
Gelatin (coated amount: 1,000 mg/m$^2$)
High boiling solvent*4 (coated amount: 250 mg/m$^2$)
Surface active agent*2 (coated amount: 100 mg/m$^2$)
Fog inhibitor (coated amount: 12 mg/m$^2$)
Support *1
*1: Polyethylene terephthalate (film thickness: 100 μm)

TABLE 1-continued

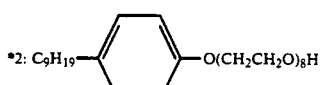

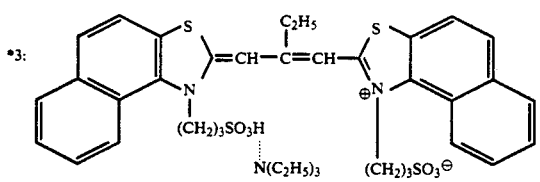

*4: (iso $C_9H_{19}O)_3P=O$
*5: Size: 4 μm
*6: 1,2-Bis(vinylsulfonylacetamide)ethane
*7: Size: 0.2 μm The preparation of a dye-fixing material D-1 will be described hereafter.

63 g of gelatin, 130 g of a mordant having the following structure and 80 g of guanidine picrate were dissolved in 1,300 ml of water. The coating solution thus obtained was then coated on a polyethylene-laminated paper support to a wet film thickness of 45 μm. The coat was then dried.

Mordant

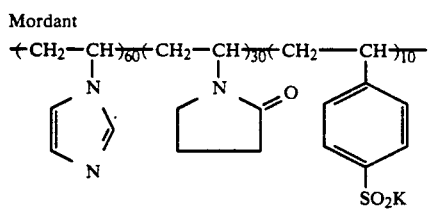

A solution obtained by dissolving 35 g of gelatin and 1.05 g of 1,2-bis (vinylsulfonylacetamideethane) in 800 ml of water was coated on the coat to a wet film thickness of 17 μm. The coat was then dried to thereby obtain the dye-fixing material D-1.

These color light-sensitive materials having the multilayer structure were exposed to light of 20 lux from a tungsten lamp in a character pattern through a transparent test chart for 1 second. The emulsion surface of the light-sensitive materials thus exposed were then supplied with water through a wire bar at a rate of 15 ml/m². Thereafter, these light-sensitive materials were laminated on the dye-fixing material in such a manner that the film surfaces were contacted with each other. The laminations were then heated for 20 seconds over a heat roller which had been controlled to keep the temperature of the film thus wet at 95° C. When the dye-fixing material was peeled off the light-sensitive material, a black character image with an excellent contrast was formed on the dye-fixing material.

The image thus obtaind was then examined by an optical character reader (HS-OCR produced by Sumitomo Electric Industries, Ltd.) for a reading test. The following results were obtained.

TABLE 2

| Light-sensitive material | Infrared-absorbing image-forming compound | % Correct reading |
|---|---|---|
| 101 | A (7) | 100 |
| 102 | B (2) | 100 |
| 103 | C (5) | 100 |
| 104 (Comparative Example 1) | — | 0 |

The term "% correct reading" used herein means a ratio of the number of correct reading to the total number of the reading tests.

As shown in the results in Table 2, the light-sensitive material comprising the present image-forming compound can exhibit an excellent readability by the OCR reader.

COMPARATIVE EXAMPLES 2 AND 3

Light-sensitive materials were prepared in the same manner as in Example 1 except that the present image-forming compounds were excluded and the cyan image-forming compound was replaced by the following compounds C-2 and C-3.

These light-sensitive materials were then subjected to exposure and development in the same manner as in Example 1. The resulting images were then examined for reading test by the OCR reader. The results are shown in the table below.

TABLE 3

| Light-sensitive material | Cyan image-forming compound | % Correct reading |
|---|---|---|
| Comparative Example 2 | C-2 | 0 |
| Comparative | C-3 | 10 |

TABLE 3-continued

| Light-sensitive material | Cyan image-forming compound | % Correct reading |
|---|---|---|
| Example 3 | | |

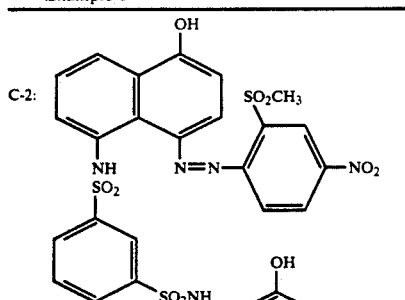

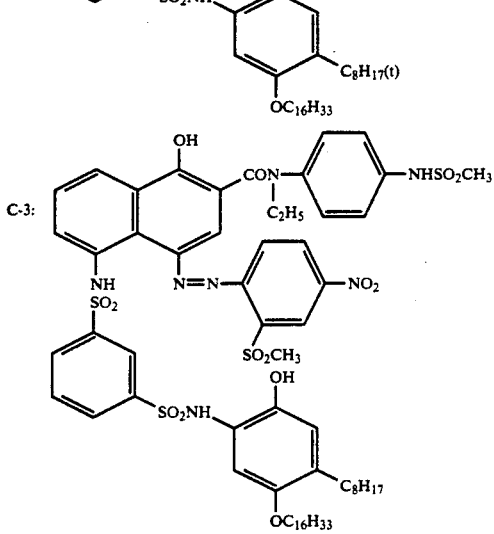

EXAMPLE 2

Multilayer color light-sensitive materials 201 to 215 were prepared in the same manner as in the color light-sensitive material 101 except that the present image-forming compound A(7) was replaced by image-forming compounds A(2), A(6), A(10), A(11), A(13), B(1), B(5), B(6), B(9), B(15), C(1), C(4), C(8), C(26) and C(27), respectively.

A dye-fixing material was prepared in the same manner as in Example 1 and laminated on these color light-sensitive materials. These specimens were then subjected to exposure and development in the same manner as in Example 1. The resulting images were examined for reading test by the OCR reader. The results are shown in the table below.

TABLE 4

| Light-sensitive material | Infrared-absorbing image-forming compound | % Correct reading |
|---|---|---|
| 201 | A (2) | 100 |
| 202 | A (6) | 100 |
| 203 | A (10) | 100 |
| 204 | A (11) | 100 |
| 205 | A (13) | 100 |
| 206 | B (2) | 100 |
| 207 | B (6) | 100 |
| 208 | B (10) | 100 |
| 209 | B (11) | 100 |
| 210 | B (13) | 100 |
| 211 | C (1) | 100 |
| 212 | C (4) | 100 |
| 213 | C (8) | 100 |

TABLE 4-continued

| Light-sensitive material | Infrared-absorbing image-forming compound | % Correct reading |
|---|---|---|
| 214 | C (26) | 100 |
| 215 | C (27) | 100 |

As shown in the results in Table 4, the present image-forming compounds can provide an excellent readability by the OCR reader.

EXAMPLE 3

The preparation of emulsions for the 1st layer and the 5th layer will be described hereafter.

600 ml of an aqueous solution containing sodium chloride and potassium bromide and an aqueous solution of silver nitrate obtained by dissolving 0.59 mol of silver nitrate in 600 ml of water were simultaneously added to an aqueous solution of gelatin (obtained by dissolving 20 g of gelatin and 3 g of sodium chloride in 1,000 ml of water and kept at a temperature of 75° C.) at the same flow rate with vigorous stirring in 40 minutes. Thus, a monodisperse emulsion of cubic silver bromochloride grains having an average grain size of 0.40 μm (bromine content: 50 mol %) was prepared.

After being washed with water and then desalted, the emulsion was subjected to chemical sensitization with 5 mg of sodium thiosulfate and 20 mg of 4-hydroxy-6-methyl-1,3,3a,7-tetrazaindene at a temperature of 60° C. The yield of the desired emulsion was 600 g.

The preparation of an emulsion for the 3rd layer will be described hereafter.

600 ml of an aqueous solution containing sodium chloride and potassium bromide and an aqueous solution of silver nitrate obtained by dissolving 0.59 mol of silver nitrate in 600 ml of water were simultaneously added to an aqueous solution of gelatin (obtained by dissolving 20 g of gelatin and 3 g of sodium chloride in 1,000 ml of water and kept at a temperature of 75° C.) at the same flow rate with vigorous stirring in 40 minutes. Thus, a monodisperse emulsion of cubic silver bromochloride grains having an average grain size of 0.35 μm (bromine content: 80 mol %) was prepared.

After being washed with water and then desalted, the emulsion was subjected to chemical sensitization with 5 mg of sodium thiosulfate and 20 mg of 4-hydroxy-6-methyl-1,3,3a,7-tetrazaindene at a temperature of 60° C. The yield of the desired emulsion was 600 g.

The preparation of a gelatin dispersion of an image-forming compound will be described hereafter.

4 g of the present image-forming compound A(7), B(2) or C(5), 4 g of the above described cyan image-forming compound, 0.3 g of the same fog inhibitor as used in Example 1, 0.5 g of sodium succinic acid-2-ethylhexylestersulfonate as surface active agent and 20 g of triisononyl phosphate were measured out. These materials were then dissolved in 60 ml of ethyl acetate at a temperature of about 60° C. to obtain a uniform solution. The solution was then mixed with 150 g of a 10% solution of lime-treated gelatin with stirring. The mixture was subjected to dispersion at 10,000 rpm in a homogenizer over 10 minutes. This dispersion was later used as a dispersion of a cyan image-forming compound.

A dispersion of a yellow image-forming compound and a dispersion of a magenta image-forming compound were then prepared in a similar manner.

Multilayer color light-sensitive materials 301, 302 and 303 as shown in Table 5 were prepared from these materials and the same organic silver salts (1) and (2) as used in Example 1. A color light-sensitive material 304 was prepared as a comparative specimen (4) in a similar manner except that the present image-forming compound was excluded.

TABLE 5

6th layer
Gelatin (coated amount: 1,000 mg/m²)
Base precursor*3 (coated amount: 600 mg/m²)
Silica*5 (coated amount: 100 mg/m²)
Film hardener*6 (coated amount: 160 mg/m²)
5th layer (Blue-sensitive emulsion layer)
Silver bromoiodide emulsion (iodine: 50 mol %; coated amount: 400 mg silver/m²)
Benzenesulfonamide (coated amount: 180 mg/m²)
Organic silver salt (1) (coated amount: 100 mg silver/m²)
Organic silver salt (2) (coated amount: 50 mg/m²)
Sensitizing dye D-1 (coated amount: $10^{-6}$ mol/m²)
Base precursor*3 (coated amount: 500 mg/m²)
Fog inhibitor (coated amount: 1,000 mg/m²)
Yellow image-forming compound (coated amount: 400 mg/m²)
Gelatin (coated amount: 1,000 mg/m²)
High boiling solvent*4 (coated amount: 800 mg/m²)
Surface active agent*2 (coated amount: 100 mg/m²),
4th layer (Intermediate layer)
Gelatin (coated amount: 1,200 mg/m²)
Base precursor*3 (coated amount: 600 mg/m²)
3rd layer (Red-sensitive emulsion layer)
Silver bromochloride emulsion emulsion layer (bromine: 80 mol %; coated amount: 300 mg silver/m²)
Benzene sulfonamide (coated amount: 180 mg/m²)
Organic silver salt (1) (coated amount: 50 mg/m²)
Orgainc silver salt (2) (coated amount: 100 mg silver/m²)

TABLE 5-continued

Sensitizing dye D-2 (coated amount: $10^{-7}$ mol/m²)
Base precursor*3 (coated amount: 450 mg/m²)
Fog inhibitor (coated amount: 24 mg/m²)
Magenta image-forming compound (coated amount: 400 mg/m²)
Gelatin (coated amount: 1,000 mg/m²)
High boiling solvent*4 (coated amount: 200 mg/m²)
Surface active agent*2 (coated amount: 100 mg/m²)
2nd layer (Intermediate layer)
Gelatin (coated amount: 1,000 mg/m²)
Base precursor*3 (coated amount: 600 mg/m²)
1st layer (Infrared-sensitive emulsion layer)
Silver bromochloride emulsion (bromine: 5 mol %; coated amount: 500 mg silver/m²)
Benzenesulfonamide (coated amount: 180 mg/m²)
Organic silver salt (1) (coated amount: 100 mg silver/m²)
Organic silver salt (2) (coated amount: 50 mg/m²)
Sensitizing dye D-3 ($10^{-8}$ mol/m²)
Base precursor*3 (coated amount: 500 mg/m²)
Fog inhibitor (coated amount: 18 mg/m²)
Present infrared image-forming compound (coated amount: 300 mg/m²)
Cyan image-forming compound (coated amount: 300 mg/m²)
Gelatin (coated amount: 500 mg/m²)
High boiling solvent*4 (coated amount: 900 mg/m²)
Surface active agent*2 (coated amount: 100 mg/m²)

Support *7
*1: Tricresyl phosphate

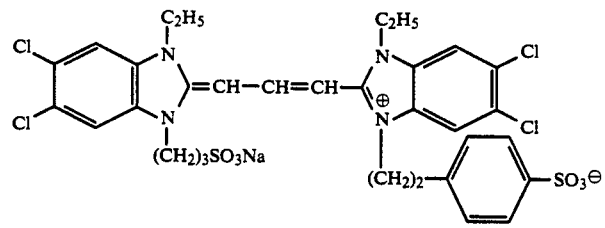

*3: Guanidine 4-chloro-phenylsulfonylacetate
*4: (iso $C_9H_{19}O)_3P=O$
*5: Size: 4 μm
*6: 1,2-Bis(vinylsulfonylacetamide)ethane
*7: Polyethylene terephthalate (film thickness 100 μm)

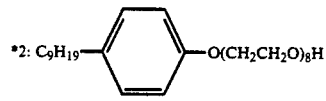

(D-1)

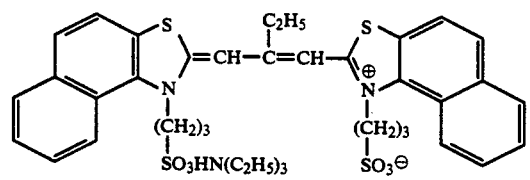

(D-2)

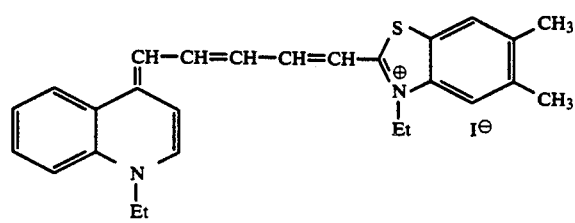

(D-3)

Cyan Image-forming Compound

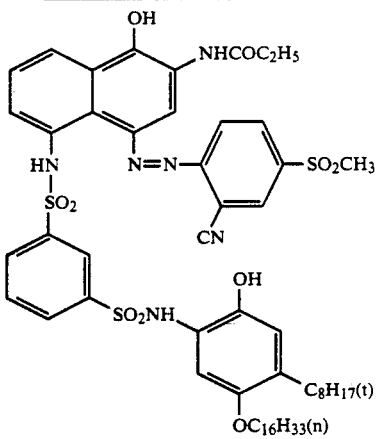

Magenta Image-forming Compound

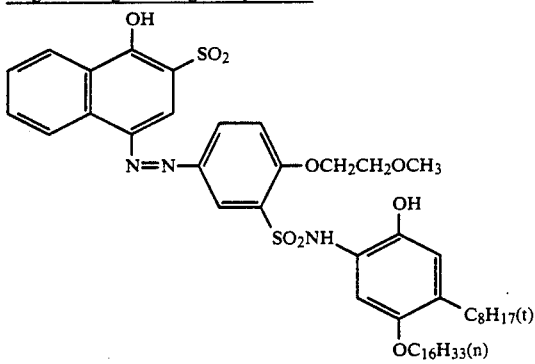

Yellow Image-forming Compound

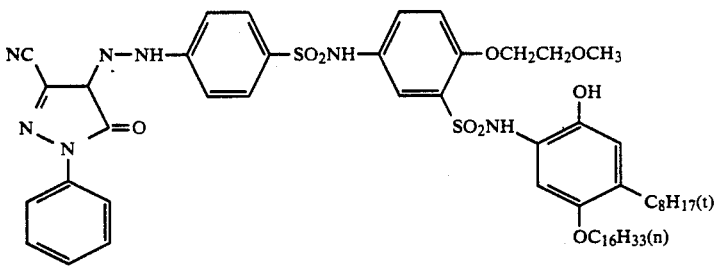

A dye-fixing material D-2 was prepared in the same manner as in D-1 in Example 1, except that guanidine picrate was excluded.

The multilayer color light-sensitive materials thus obtained were exposed to light of 15 lux from a tungsten lamp through the same test chart as used in Example 1.

These specimens were then uniformly heated over a heat bloc which had been heated to a temperature of 140° C. for 30 seconds.

The film surface of the dye-fixing material was supplied with water at a rate of 20 ml per 1 m². The light-sensitive coated materials which had been heat-treated were then laminated on the dye-fixing material in such a manner that the film surfaces were contacted with each other.

These laminations were then heated over a heat bloc which had been heated to a temperature of 80° C. for 6 seconds. When the dye-fixing material was peeled off the light-sensitive materials, black character images with excellent contrast were obtained on the dye-fixing material.

The images were then examined for reading test by the OCR reader. The results are shown in the table below.

TABLE 6

| Light-sensitive material | Infrared-absorbing image-forming compound | % Correct reading |
|---|---|---|
| 301 | A (7) | 100 |
| 302 | B (2) | 100 |
| 303 | C (5) | 100 |
| 304 (Comparative Example 4) | — | 0 |

As shown in the results in Table 6, the present image-forming compounds are also effective in a system wherein development is effected at as high a temperature as 100° C. or higher.

While the invention has been described in detail and with reference to specific embodiments thereof, it will be apparent to one skilled in the art that various changes and modifications can be made therein without departing from the spirit and scope thereof.

What is claimed is:

1. A silver halide color light-sensitive material comprising a support having thereon at least a silver halide and an infrared-absorbing image-forming compound represented by formula (I):

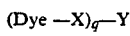 (I)

wherein Dye represents an infrared-absorbing dye group or an infrared-absorbing dye precursor group derived from a compound represented by formula (II)A, (II)B or (II)C; X represents a chemical bond or a connecting group; Y represents a group capable of making a difference in the diffusibility of the dye component of said compound represented by formula (I) between before and after reaction with a silver halide having a latent image in correspondence or counter correspondence to the silver halide having a latent image; and q represents an integer 1 or 2, and when q is 2, the two (Dye-X) groups may be the same or different;

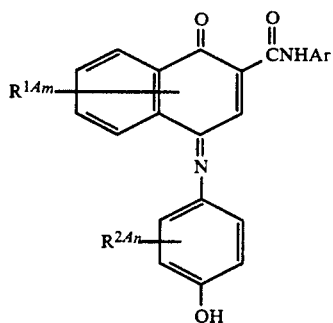 (II)A wherein $R^{1A}$ and $R^{2A}$ may be the same or different and each represents a substituent selected from the group consisting of a hydrogen atom, a halogen atom, a hydroxyl group, a cyano group, a carboxyl group, a sulfo group, an alkyl group, a cycloalkyl group, an aralkyl group, an aryl group, a heterocyclic group, an alkoxy group, an aryloxy group, an amino group, an acylamino group, a sulfonylamino group, an acyl group, a sulfonyl group, a carbamoyl group, a sulfamoyl group, a ureido group, a urethane group, an alkylthio group, an arylthio group, a nitro group and an alkoxycarbonyl group; and Ar represents an aryl group of a heterocyclic group, which substituents may be further substituted by other substituents;

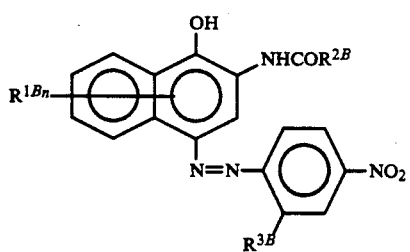 (II)B wherein $R^{1B}$ has the same meaning as $R^{1A}$; $R^{2B}$ represents a substituent selected from the group consisting of an alkyl group, an aryl group, a heterocyclic group, an alkoxy group and an amino group; and $R^{3B}$ represents a substituent selected from the group consisting of a halogen atom, an alkoxy group, an amino group, an alkylthio group, an aryloxy group, an acylamino group, an aryl group and a heterocyclic group, which substituents may be further substituted by other substituents;

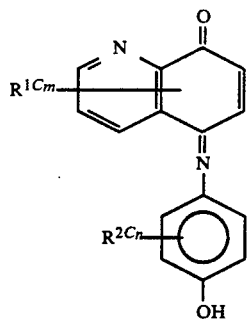 (II)C wherein $R^{1C}$ and $R^{2C}$ may be the same or different and each has the same meaning as $R^{1A}$; and m and n each represents an integer of from 1 to 4, with the proviso that if m and n each is 2 to 4, the plurality of substituents may be the same or different, these substituents may be further substituted by other substituents;

Dye and X may be bonded to each other in any position in formulas (II)A, (II)B and (II)C.

2. A silver halide color light-sensitive material as claimed in claim 1, wherein X represents —SO$_2$NH—.

3. A silver halide color light-sensitive material as claimed in claim 1, wherein the amount of said compound represented by formula (I) is from 0.05 to 1.0 g/m$^2$.

4. A silver halide color light-sensitive material as claimed in claim 1, wherein said light-sensitive material is a heat developable light-sensitive material.

5. A silver halide color light-sensitive material as claimed in claim 1, wherein Dye represents an infrared-absorbing dye group or an infrared-absorbing dye precursor group derived from a compound represented by formula (II)A.

6. A silver halide color light-sensitive material as claimed in claim 1, wherein Dye represents an infrared-absorbing dye group or an infrared-absorbing dye precursor group derived from a compound represented by formula (II)B.

7. A silver halide color light-sensitive material as claimed in claim 1, wherein Dye represents an infrared-absorbing dye group or an infrared-absorbing dye precursor group derived from a compound represented by formula (II)C.

8. An image forming method which comprises imagewise exposing silver halide color light-sensitive material comprising a support having thereon at least a silver halide and an infra-red-absorbing image-forming compound represented by formula (I):

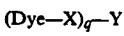 (I)

wherein Dye represents an infrared-absorbing dye group or an infrared-absorbing dye precursor group derived from a compound represented by formula (II)A, (II)B or (II)C; X represents a chemical bond or a connecting group; Y represents a group capable of making a difference in the diffusibility of the dye component of said compound represented by formula (I) between before and after reaction with a silver halide having a latent image in correspondence or counter correspondence to the silver halide having a latent image; and q represents an integer 1 or 2, and when q is 2, the two (Dye-X) groups may be the same or different:

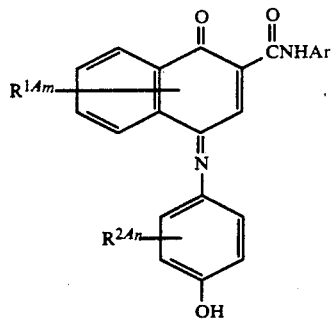

(II)A wherein $R^{1A}$ and $R^{2A}$ may be the same or different and each represents a substituent selected from the group consisting of a hydrogen atom, a halogen atom, a hydroxyl group, a cyano group, a carboxy group, a sulfo group, an alkyl group, a cycloalkyl group, an aralkyl group, an aryl group, a heterocyclic group, an alkoxy group, an aryloxy group, an amino group, an acylamino group, a sulfonylamino group, an acyl group, a sulfonyl group, a carbamoyl group, a sulfamoyl group, a ureido group, a urethane group, an alkylthio group, an arylthio group, a nitro group and an alkoxycarbonyl group and Ar represents an aryl group or a heterocyclic group, which substituents may be further substituted by other substituents;

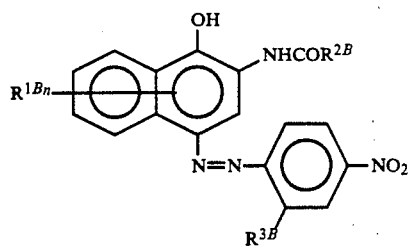

(II)B wherein $R^{1B}$ has the same meaning as $R^{1A}$; $R^{2B}$ represents a substituent selected from the group consisting of an alkyl group, an aryl group, a heterocyclic group, an alkoxy group and an amino group; and $R^{3B}$ represents a substituent selected from the group consisting of a halogen atom, an alkoxy group, an amino group, an alkylthio group, an aryloxy group, an acylamino group, an aryl group and a heterocyclic group, which substituents may be further substituted by other substituents;

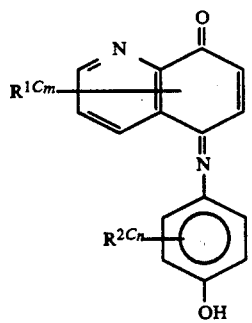

(II)C wherein $R^{1C}$ and $R^{2C}$ may be the same or different and each represents a substituent selected from the group consisting of a hydrogen atom, a halogen atom, a hydroxyl group, a cyano group, a carboxyl group, a sulfo group, an alkyl group, a cycloalkyl group, an aralkyl group, an aryl group, a heterocyclic group, an alkoxy group, an aryloxy group, an amino group, an acylamino group, a sulfonylamino group, an acyl group, a sulfonyl group, a carbamoyl group, a sulfamoyl group, a ureido group, a urethane group, an alkylthio group, an arylthio group, a nitro group and an alkoxycarbonyl group, which substituents may be further substituted by other substituents; and m and n each represents an integer of from 1 to 4, with the proviso that if m and n each is 2 to 4, the plurality of substituents may be the same or different, these substituents may be further substituted by other substituents;

Dye and X may be bonded to each other in any position in formula (II)A, (II)B and (II)C;

thermally developing said light-sensitive material; transferring onto said image-receiving material the same dye component formed from the same image-forming compound of formula (I) in correspondence or counter correspondence to the exposed silver halide having a latent image, and chelating the dye component with a metal ion to form an image of the chelated dye component in the image receiving material.

9. An image forming method as in claim 8, wherein Dye represents an infrared-absorbing dye group or an infrared-absorbing dye precursor group derived from a compound represented by formula (II)A.

10. An image forming method as in claim 8, wherein Dye represents an infrared-absorbing dye group or an infrared-absorbing dye precursor group derived from a compound represented by formula (II)B.

11. An image forming method as in claim 8, wherein Dye represents an infrared-absorbing dye group or an infrared-absorbing dye precursor group derived from a compound represented by formula (II)C.

12. An image forming method which comprises imagewise exposing silver halide color light-sensitive material comprising a support having thereon at least a silver halide and an infra-red-absorbing image-forming compound represented by formula (I):

$$(Dye-X)_q-Y \qquad (I)$$

wherein Dye represents an infrared-absorbing dye group or an infrared-absorbing dye precursor group derived from a compound represented by formula (II)A, (II)B or (II)C; X represents a chemical bond or a connecting group; Y represents a group capable of making a difference in the diffusibility of the dye component of said compound represented by formula (I) between before and after reaction with a silver halide having a latent image in correspondence or counter correspondence to the silver halide having a latent image; and q represents an integer 1 or 2, and when q is 2, the two (Dye-X) groups may be the same or different:

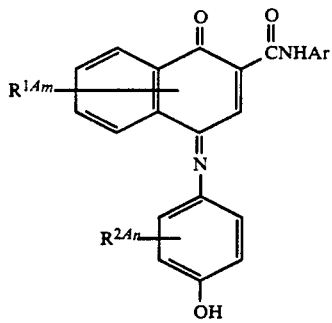

(II)A wherein $R^{1A}$ and $R^{2A}$ may be the same or different and each represents a substituent selected from the group consisting of a hydrogen atom, a halogen atom, a hydroxyl group, a cyano group, a carboxyl group, a sulfo group, an alkyl group, a cycloalkyl group, an aralkyl group, an aryl group, a heterocyclic group, an alkoxy group, an aryloxy group, an amino group, an acylamino group, a sulfonylamino group, an acyl group, a sulfonyl group, a carbamoyl group, a sulfamoyl group, a ureido group, a urethane group, an alkylthio group, an arylthio group, a nitro group and an alkoxycarbonyl group; and Ar represents an aryl group or a heterocyclic group, which substituents may be further substituted by other substituents;

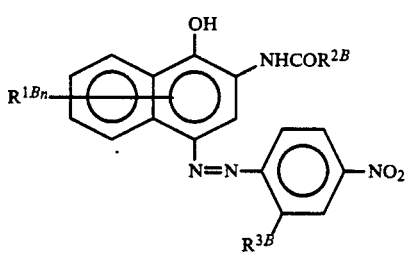

(II)B wherein $R^{1B}$ has the same meaning as $R^{1A}$; $R^{2B}$ represents a substituent selected from the group consisting of an alkyl group, an aryl group, a heterocyclic group, an alkoxy group and an amino group; and $R^{3B}$ represents a substituent selected from the group consisting of a halogen atom, an alkoxy group, an amino group, an alkylthio group, an aryloxy group, an acylamino group, an aryl group and a heterocyclic group, which substituents may be further substituted by other substituents;

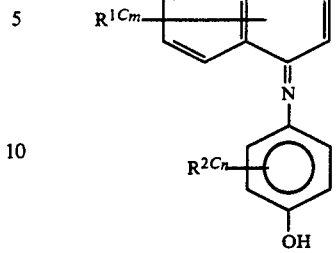

(II)C wherein $R^{1C}$ and $R^{2C}$ may be the same or different and each represents a substituent selected from the group consisting of a hydrogen atom, a halogen atom, a hydroxyl group, a cyano group, a carboxyl group, a sulfo group, an alkyl group, a cycloalkyl group, an aralkyl group, an aryl group, a heterocyclic group, an alkoxy group, an aryloxy group, an amino group, an acylamino group, a sulfonylamino group, an acyl group, a sulfonyl group, a carbamoyl group, a sulfamoyl group, a ureido group, a urethane group, an alkylthio group, an arylthio group, a nitro group and an alkoxycarbonyl group, which substituents may be further substituted by other substituents; and m and n each represents an integer of from 1 to 4, with the proviso that if m and n each is 2 to 4, the plurality of substituents may be the same or different, these substituents may be further substituted by other substituents;

Dye and X may be bonded to each other in any position in formula (II)A, (II)B and (II)C;

thermally developing said light-sensitive material; and transferring onto said image-receiving material the said dye component formed from the said image-forming compound of formula (I) in correspondence or counter correspondence to the exposed silver halide having a latent image.

13. An image forming method as in claim 12, wherein Dye represents an infrared-absorbing dye group or an infrared-absorbing dye precursor group derived from a compound represented by formula (II)A.

14. An image forming method as in claim 12, wherein Dye represents an infrared-absorbing dye group or an infrared-absorbing dye precursor group derived from a compound represented by formula (II)B.

15. An image forming method as in claim 12, wherein Dye represents an infrared-absorbing dye group or an infrared-absorbing dye precursor group derived from a compound represented by formula (II)C.

* * * * *